(12) United States Patent
Larsson et al.

(10) Patent No.: US 12,134,214 B2
(45) Date of Patent: Nov. 5, 2024

(54) METHOD FOR MANUFACTURING A CELLULOSE PRODUCT BY A PRESSURE MOULDING APPARATUS, PRESSURE MOULDING APPARATUS AND CELLULOSE PRODUCT

(71) Applicant: PulPac AB, Gothenburg (SE)

(72) Inventors: Ove Larsson, Västra Frölunda (SE); Linus Larsson, Gothenburg (SE)

(73) Assignee: PulPac AB, Västra Frölunda (SE)

( * ) Notice: Subject to any disclaimer, the term of this patent is extended or adjusted under 35 U.S.C. 154(b) by 182 days.

(21) Appl. No.: 17/716,908

(22) Filed: Apr. 8, 2022

(65) Prior Publication Data

US 2022/0227027 A1 Jul. 21, 2022

Related U.S. Application Data

(63) Continuation of application No. 16/085,456, filed as application No. PCT/SE2017/050254 on Mar. 16, 2017, now Pat. No. 11,407,149.

(30) Foreign Application Priority Data

Mar. 18, 2016 (SE) .................................. 1630058-4

(51) Int. Cl.
*B29C 43/10* (2006.01)
*B27N 3/04* (2006.01)
(Continued)

(52) U.S. Cl.
CPC ................ *B29C 43/10* (2013.01); *B27N 3/04* (2013.01); *B27N 3/08* (2013.01); *B27N 5/02* (2013.01);
(Continued)

(58) Field of Classification Search
None
See application file for complete search history.

(56) References Cited

U.S. PATENT DOCUMENTS

| 3,114,670 A | 12/1963 | Iwasaki |
| 3,546,740 A | 12/1970 | Johnson |

(Continued)

FOREIGN PATENT DOCUMENTS

| CL | 199500343 | 9/1993 |
| CL | 200300817 | 4/2004 |

(Continued)

OTHER PUBLICATIONS

Office Action in corresponding Japanese Patent Application No. 2022-176490, dated Nov. 10, 2023.
(Continued)

*Primary Examiner* — Jacob T Minskey
*Assistant Examiner* — Adrianna N Konves
(74) *Attorney, Agent, or Firm* — MARSHALL, GERSTEIN & BORUN LLP

(57) ABSTRACT

The present invention relates to a method of manufacturing a cellulose product having a flat or non-flat product shape by a pressure moulding apparatus comprising a forming mould. The forming mould has a forming surface defining said product shape, The method comprises the steps of:
arranging a cellulose blank containing less than 45 weight percent water in said forming mould; heating said cellulose blank to a forming temperature in the range of 100° C. to 200° C.; and pressing said cellulose blank by means of said forming mould with a forming pressure acting on the cellulose blank across said forming surface, said forming pressure being in the range of 1 MPa to 100 MPa.

7 Claims, 15 Drawing Sheets

(51) Int. Cl.

| | | |
|---|---|---|
| *B27N 3/08* | (2006.01) | |
| *B27N 5/02* | (2006.01) | |
| *B29B 13/06* | (2006.01) | |
| *B29C 43/00* | (2006.01) | |
| *B29C 43/02* | (2006.01) | |
| *B29C 43/20* | (2006.01) | |
| *B29C 43/36* | (2006.01) | |
| *B29C 43/46* | (2006.01) | |
| *B29C 43/52* | (2006.01) | |
| *B29C 43/58* | (2006.01) | |
| *B29C 49/00* | (2006.01) | |
| *B29C 49/22* | (2006.01) | |
| *B29C 51/00* | (2006.01) | |
| *B29C 51/08* | (2006.01) | |
| *B29C 51/30* | (2006.01) | |
| *B29C 51/42* | (2006.01) | |
| *B31B 50/59* | (2017.01) | |
| *B65B 43/08* | (2006.01) | |
| *D04H 1/732* | (2012.01) | |
| *B29C 49/04* | (2006.01) | |
| *B29C 49/58* | (2006.01) | |
| *B29C 51/16* | (2006.01) | |
| *B29K 1/00* | (2006.01) | |
| *B29K 311/10* | (2006.01) | |
| *B29L 31/00* | (2006.01) | |
| *B31B 120/00* | (2017.01) | |

(52) U.S. Cl.
CPC ......... *B29B 13/065* (2013.01); *B29C 43/003* (2013.01); *B29C 43/02* (2013.01); *B29C 43/20* (2013.01); *B29C 43/3642* (2013.01); *B29C 43/46* (2013.01); *B29C 43/52* (2013.01); *B29C 43/58* (2013.01); *B29C 49/0005* (2013.01); *B29C 49/22* (2013.01); *B29C 51/002* (2013.01); *B29C 51/004* (2013.01); *B29C 51/082* (2013.01); *B29C 51/30* (2013.01); *B29C 51/42* (2013.01); *B31B 50/59* (2017.08); *B65B 43/08* (2013.01); *D04H 1/732* (2013.01); *B29C 2043/3647* (2013.01); *B29C 2043/5808* (2013.01); *B29C 49/04* (2013.01); *B29C 49/58* (2013.01); *B29C 51/08* (2013.01); *B29C 51/16* (2013.01); *B29K 2001/00* (2013.01); *B29K 2311/10* (2013.01); *B29L 2031/7158* (2013.01); *B31B 2120/00* (2017.08)

(56) References Cited

U.S. PATENT DOCUMENTS

| | | |
|---|---|---|
| 4,311,555 A | 1/1982 | Reinhall |
| 4,474,846 A | 10/1984 | Doerer et al. |
| 4,640,810 A | 2/1987 | Laursen et al. |
| 4,708,626 A | 11/1987 | Sakai et al. |
| 5,094,791 A | 3/1992 | Nopper |
| 5,302,445 A | 4/1994 | DePetris et al. |
| 5,413,746 A | 5/1995 | Birjukov |
| 5,904,643 A | 5/1999 | Seeberger et al. |
| 6,010,595 A | 1/2000 | Mitchell et al. |
| 6,267,252 B1 | 7/2001 | Amsler |
| 8,545,953 B2 | 10/2013 | Burgdorfer et al. |
| 2001/0029714 A1 | 10/2001 | Lynch et al. |
| 2002/0012759 A1 | 1/2002 | Asayama et al. |
| 2003/0029591 A1 | 2/2003 | Otani et al. |
| 2004/0045690 A1 | 3/2004 | Eto et al. |
| 2004/0056379 A1 | 3/2004 | Haataja |
| 2004/0265453 A1 | 12/2004 | Helou et al. |
| 2005/0145327 A1 | 7/2005 | Frankefort et al. |
| 2009/0057958 A1 | 3/2009 | Anghileri et al. |
| 2010/0116181 A1 | 5/2010 | Christoffel et al. |
| 2010/0190020 A1 | 7/2010 | Frederiksen et al. |
| 2012/0132361 A1* | 5/2012 | Corbett ................ B65D 11/02 156/287 |
| 2016/0145811 A1* | 5/2016 | Socci ................ D21J 3/10 162/217 |
| 2016/0250785 A1 | 9/2016 | Shimotake et al. |

FOREIGN PATENT DOCUMENTS

| | | |
|---|---|---|
| CN | 2115359 | 9/1992 |
| CN | 1647948 A | 8/2005 |
| CN | 1958946 | 5/2007 |
| CN | 201068210 | 6/2008 |
| CN | 201287979 Y | 8/2009 |
| CO | 95009413 | 3/1995 |
| CO | 04047467 | 5/2004 |
| DE | 1146740 B | 4/1963 |
| DE | 19619463 A1 | 11/1997 |
| EP | 0424909 A2 | 5/1991 |
| EP | 0725851 A1 | 8/1996 |
| EP | 1029978 A2 | 8/2000 |
| EP | 2004377 A1 | 12/2008 |
| EP | 2004517 A1 | 12/2008 |
| EP | 2129705 A1 | 12/2009 |
| EP | 2163378 A1 | 3/2010 |
| EP | 2004517 B1 | 4/2015 |
| GB | 1417826 A | 12/1975 |
| JP | H04166970 A | 6/1992 |
| JP | 2001146699 A | 5/2001 |
| JP | 2001322190 A | 11/2001 |
| JP | 2002509781 A | 4/2002 |
| JP | 2002138397 A | 5/2002 |
| JP | 2002179044 A | 6/2002 |
| JP | 2002201598 A | 7/2002 |
| JP | 2002266299 A | 9/2002 |
| JP | 2003311721 A | 11/2003 |
| JP | 2004346441 A | 12/2004 |
| JP | 2008290691 A | 12/2008 |
| JP | 2012530007 A | 11/2012 |
| JP | 2015203163 | 11/2015 |
| KR | 20020026837 A | 4/2002 |
| RU | 2434746 C2 | 11/2011 |
| SU | 1493706 A1 | 7/1989 |
| WO | WO-86/00097 A1 | 1/1986 |
| WO | WO-199512020 A1 | 5/1995 |
| WO | WO-9856571 A1 | 12/1998 |
| WO | WO-2002042070 A1 | 5/2002 |
| WO | WO-2006002015 A1 | 1/2006 |
| WO | WO-2007104431 A1 | 9/2007 |
| WO | WO-2007113750 A2 | 10/2007 |
| WO | WO-200810693 A1 | 1/2008 |
| WO | WO-2008040821 A2 | 4/2008 |
| WO | WO-2010000945 A1 | 1/2010 |
| WO | WO-2012139590 A1 | 10/2012 |
| WO | WO-2014142714 A1 | 9/2014 |
| WO | WO-2017160218 A1 | 9/2017 |
| WO | WO-18033208 A1 | 2/2018 |

OTHER PUBLICATIONS

Office Action in corresponding European Patent Application No. 21162661.9 dated Sep. 15, 2022.

Office Action in corresponding Mexican Patent Application No. MX/a/2018/010761 dated Mar. 7, 2023.

Louise Melin, "Development of DuraPulp packaging demonstrator", Masters Thesis, Lund University, Sep. 2015.

Office Action in corresponding Japanese Patent Application No. 2021-143393, dated Jun. 20, 2022.

Communication pursuant to Rule 114(2) EPC, Third Party Observation, in corresponding European patent application No. 21162661.9, dated Aug. 28, 2023.

International Search Report and Written Opinion for Application No. PCT/SE2017/050254, dated May 24, 2017.

International Preliminary Report on Patentability for Application No. PCT/SE2017/050254, dated Feb. 22, 2018.

(56) References Cited

OTHER PUBLICATIONS

Larsson, P.A., Wagberg, L., "Towards natural-fibre-based thermoplastic films produced by conventional papermaking," *Green Chemistry*, pp. 3324-3333 (2016).
Linvill, E., "Development of Finite Element Models for 3-D Forming Processes of Paper and Paperboard," Licentiate Thesis No. 126, *KTH Royal Institute of Technology*, School of Engineering Sciences, Department of Solid Mechanics, pp. 10-11 (2015).
Larsson, P.A., Berglund, L.A., and Wagberg, L., "Ductile All-Cellulose Nanocomposite Films Fabricated from Core-Shell Structured Cellulose Nanofibrils," *Biomacromolecules*, pp. 2218-2223 (2014).
Nilsson, H., Galland, S., Larsson, P.T., Gamstedt, E.K., Nishino, T., Berglund, L.A., and Iversen, T., "A non-solvent approach for high-stiffness all-cellulose biocomposites based on pure wood cellulose," *Composites Science and Technology*, pp. 1704-1712 (2010).
International Search Report and Written Opinion for Application No. PCT/SE2017/050255, dated May 24, 2017.
International Preliminary Report on Patentability for Application No. PCT/SE2017/050255, dated Feb. 22, 2018.
Thibaud Pintiaux et al. "High Pressure Compression-Molding of α-Cellulose and Effects of Operating Conditions", *Materials*, pp. 2240-2261 (2013).
Extended European Search Report for Application No. EP 17767071.8, dated Oct. 24, 2019.
"Gonzalez, Gilmar y otros.—Cálculo y diseño de un molde de inyección soplado. Corporación Universitaria Autónoma de Occidente. División Ingenierías. Programa de Ingeniería Mecánica." (2010).
"Interempresas.—moldeo por soplado; equipos y accesorios" (1995).
"Tecnologia y Ciencia.—blog de Tecnología en la enseñanza" (2012).
Office Action in corresponding Colombia patent application No. NC2018/0009542, dated Feb. 17, 2020.
Office Action in corresponding Chilean patent application No. 201802601, dated Mar. 13, 2020.
Office Action in corresponding Chinese patent application No. 201780030539.3, dated Apr. 2, 2020.
Office Action in corresponding Russian patent application No. 2018136582, dated Jun. 10, 2020.
Search Report in corresponding Russian patent application No. 2018136582, dated Jun. 9, 2020.
Decision to Grant in corresponding Russian patent application No. 2018136582, dated Sep. 22, 2020.
Extended European Search Report for Application No. 17767070.0, dated Nov. 26, 2019.
Office Action in Japanese patent application No. 2019-500208, dated Aug. 31, 2020.
Extended European Search Report for Application No. 20175190.6, dated Oct. 6, 2020.
Office Action in corresponding Korean Patent Application No. 10-2018-7029222, mailed Nov. 17, 2020.
Office Action in corresponding Colombia patent application No. NC2018/0009542, dated Nov. 24, 2020.
Office Action in corresponding India patent application No. 201817035709, dated Dec. 16, 2020.
Office Action in corresponding India patent application No. 201817035544, dated Jan. 12, 2021.
Office Action in corresponding Japanese patent application No. 2019-500209, dated Jan. 28, 2021. (English Translation).
Extended European Search Report for Application No. EP 21162661.9, dated Jun. 28, 2021.
Office Action in corresponding Brazilian patent application No. 112018068731, dated Sep. 28, 2021.
Extended European Search Report for Application No. EP 21206500.7, dated Jan. 20, 2022.
Extended European Search Report for Application No. EP 21206499.2, dated Jan. 25, 2022.
Office Action in corresponding Australian patent application No. 2017233234, dated Feb. 9, 2022.
Office Action in corresponding Australian patent application No. 2017233235, dated Feb. 17, 2022.
Office Action in corresponding Brazilian patent application No. BR112018068720, dated Sep. 28, 2021.
Office Action in corresponding Chinese patent application No. 202011163968.8 dated Feb. 28, 2022.
Communication pursuant to Rule 114(2) EPC, Third Party Observation, in corresponding European patent application No. 21206500.7, dated Feb. 23, 2024.
Subhash K. Batra and Behnam Pourdeyhimi, "Introduction to Nonwovens Technology", DEStech Publications, Inc. (2012).

\* cited by examiner

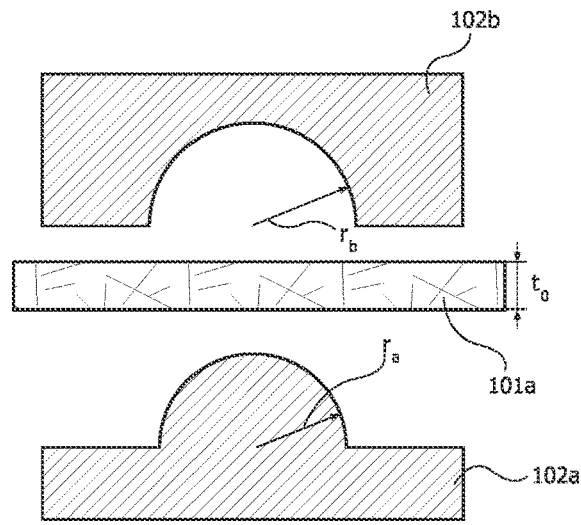
(Prior art) *Fig. 1a*
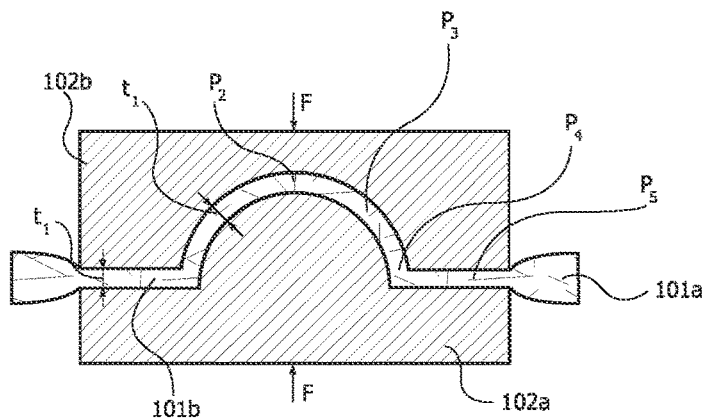
(Prior art) *Fig. 1b*
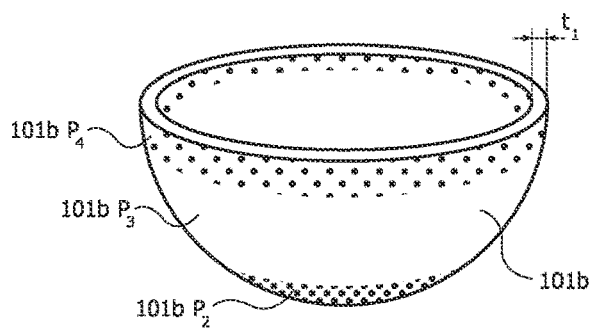
(Prior art) *Fig. 1c*

METHOD FOR MANUFACTURING A CELLULOSE PRODUCT BY A PRESSURE MOULDING APPARATUS, PRESSURE MOULDING APPARATUS AND CELLULOSE PRODUCT

TECHNICAL FIELD

The present disclosure relates to a method of manufacturing a cellulose product from wood pulp, an apparatus for manufacturing such a cellulose product and a cellulose product.

BACKGROUND

There are many situations where it is desirable to provide two-dimensional (2D) or three-dimensional (3D) shaped objects made of sustainable materials. One such situation relates to packaging of sensitive goods, such as mechanical high precision items, electronic equipment and other household and hardware items, that need protective packaging in order to avoid damage of the sensitive goods, due to for example mechanical shock, vibrations or compression during transport, storage, or other handling. Such packages typically require a protective insert that has a shape adapted to the goods contained, and thus securely holds the goods in the package. Such inserts are commonly made of expanded polystyrene (EPS), which is a lightweight petroleum derived material and is not regarded as a sustainable material.

A low price material commonly used for packaging inserts is moulded pulp. Moulded pulp has the advantage of being considered as a sustainable packaging material, since it is produced from biomaterials and can be recycled after use. As a consequence moulded pulp has been quickly increasing in popularity for both primary and secondary packaging applications (packaging next to the article and assembly of such packages). Moulded pulp articles are generally formed by immersing a suction mould into a pulp suspension, while suction is applied, whereby a body of pulp is formed with the shape of the desired article by fibre deposition. The suction mould is then withdrawn from the suspension and the suction is generally continued to compact the deposited fibres while exhausting residual liquid.

A common disadvantage with all wet-forming techniques is the need for drying of the moulded product, which is a time and energy consuming step. Another drawback is that strong inter-fibre bonds, often explained as hydrogen bonds, are formed between the fibres in the material, which restrict the flexibility of the material.

Moreover, many modern lean production lines require in-line on-demand package or component manufacturing where a wet-forming process not is preferred.

Lately, new fibre-based materials have been developed with the purpose of enabling dry forming of three-dimensional objects. One approach is disclosed by WO2014142714A1. WO2014142714A1 discloses a dry-laid composite web being an intermediate product for thermoforming of three-dimensionally shaped objects, comprising 40-95 wt-% CTMP fibres, 5-50 wt-% thermoplastic material, and 0-10 wt-% additives, wherein the dry-laid composite web has been impregnated with a dispersion, an emulsion, or a solution containing the thermoplastic material, polymer, and dried, obtaining a density of 50-250 kg/m3, or, if compressed by calendaring 400-1000 kg/m3. According to WO2014142714A1, bonding of the polymer is activated by the higher temperature applied in the thermoforming process and contributes to the final strength of the thermoformed object.

Although the polymer according to WO2014142714A1 may be contributing to the final strength and enabling forming of dry-laid web, such thermoplastic ingredient will erase the sustainable features of the cellulose since the composite will not be recyclable. This disadvantage is applicable even if a renewable and compostable bio-plastic, e.g. polylactide (PLA) is used as proposed by WO2014142714A1, since logistics for material recycling is not available.

Recent findings and political decisions, e.g. Paris agreement on global warming 2015, stipulates that the carbon footprint of consumed goods and packages, in so called life cycle analysis (LCA), is highly influenced by the ability to recycle and reuse materials. Even renewable materials like cellulose and PLA must be recycled in order to measure up with multi recycled non-renewable materials like polyethylene terephthalate (PET).

Material recycling is slowly and gradually becoming more and more established in most parts of the world. Europe has the global lead with approximately 30% recycling while United States only has reached 10% and still many development countries has not yet started to recycle. Common for all recycling efforts is a focus on the most frequently used materials such as paper, card board, glass, aluminium, steel and PET. These recyclable fractions represent a vast majority of wasted goods and it is not likely that other fractions, like bio-polymers, will be established as public available recycle logistics in a foreseeable future.

The global demand for 3D formed packages, boxes, cups, plates, bowls, inserts and covers in renewable and recyclable material with mechanical properties close to plastics, is therefore huge.

ISBN 978-91-7501-518-7 (Helena Halonen, October, 2012) has studied one approach—hydroxyethylcellulose (HEC) for creating a new all-cellulose composite material by compression moulding of commercial chemical wood pulps processed with only water. The objective was to study the structural changes during processing and the complexity of relating the mechanical properties of the final bio composites to the nano scale structure.

The combination of high temperature (150-170° C.) and high pressure (45 MPa) during compression moulding yields a remarkable increase in fibril aggregation, possibly including cellulose-cellulose fusion bonds, i.e., fibril aggregation in the fibre-fibre bond region. This fibril aggregation is resulting in a bio-composite with remarkable mechanical properties including improved strength (289 MPa), modulus (12.5 GPa) and toughness (6%) to be compared to e.g. PET-strength (75 MPa) and PET-modulus (PET 3 GPa).

Although WO2014142714A1 proposes non-recyclable thermoplastic ingredient and ISBN 978-91-7501-518-7 presents scientific results for forming recyclable cellulose fibres, to obtain good mechanical properties, no practical or industrial method has so far been invented enabling commercial production, with reasonable cycle time, of packages and gods in cellulose as replacement for plastics which are possible to recycle as cardboard.

SUMMARY

An object of the present disclosure is to provide a method for manufacturing a cellulose product, a cellulose forming apparatus and a cellulose product where the previously mentioned problems are avoided. This object is at least partly achieved by the features of the independent claims. The dependent claims contain further developments of the method for manufacturing a cellulose product, the cellulose forming apparatus and the cellulose product.

There are many situations where it is desirable to provide objects made of sustainable materials in flat or essentially non-flat shapes. A flat shape may refer to a generally two-dimensional shape, such as for example the shape of a sheet material or blank, and essentially non-flat shapes may refer to any suitable three-dimensional object shape. One such situation relates to the packaging of liquids, dry materials and different types of goods, where the packaging may be made in a three-dimensional shape or formed into a three-dimensional shape from a two-dimensional sheet material.

The invention relates to a method of manufacturing a cellulose product having a flat or non-flat product shape by a pressure moulding apparatus comprising a forming mould, the forming mould having a forming surface defining said product shape, comprising the steps of:
 arranging a cellulose blank containing less than 45 weight percent water in said forming mould;
 heating said cellulose blank to a forming temperature in the range of 100° C. to 200° C.; and
 pressing, said cellulose blank by means of said forming mould with a forming pressure acting on the cellulose blank across said forming surface, said forming pressure being in the range of 1 MPa to 100 MPa.

The forming pressure may be an isostatic pressure or a non-isostatic pressure.

According to a further aspect of the present invention, it is provided a method of manufacturing a cellulose product having a non-flat product shape, comprising the steps of: providing an isostatic pressure moulding apparatus comprising a forming mould having a forming surface defining said product shape, and a pressure mould; arranging a cellulose blank containing less than 45 weight percent water between the forming mould and the pressure mould; heating the cellulose blank to a forming temperature in the range of 100° C. to 200° C.; and pressing, by means of the pressure mould, the cellulose blank against the forming mould with a substantially equal forming pressure acting on the cellulose blank across the forming surface, the forming pressure being in the range of 1 MPa to 100 MPa.

The heating step and the pressing step may at least partly take place at the same time, or the cellulose blank may be pre-heated and no additional heat supplied during pressing.

The cellulose product may for example be a container or a part of a container where the cellulose product manufacturing using the method according to embodiments of the present invention may, for example, replace plastic products that are more difficult to recycle. Accordingly, cellulose products manufactured using the inventive method may, for example, be packages, inserts for packages, boxes, bowls, plates, cups, trays, or covers.

By the term "isostatic" should be understood the volumetric pressure on the fibres, of the heated bio-composite during the process of fibril aggregation, is substantially equal in all geometrical locations of the final 3D object during production.

By the term "non-isostatic" should be understood the volumetric pressure on the fibres, of the heated bio-composite during the process of fibril aggregation, is not equal in all geometrical locations of the final 3D object during production.

The cellulose blank may be provided in various forms, for example as a web, a rug, felt, loose fibres, foam, sheets, etc.

The blank might contain minor substances (0-10%) of agents for increasing strength, decreasing hygroscopy or making the final component hydrophobic, flameproof, colouring the component or in other way alter the features of the final material. The amount of additives should however not jeopardize the purpose of this invention to make the components recyclable as cardboard.

The blank may be produced in a pulp converting plant as rug in rolls.

The present invention is based upon the realization that a flat or non-flat cellulose product can be made more homogeneous and with shorter cycle times using an isostatic pressure moulding apparatus. In particular, the present inventors have found that, depending on the desired shape of the cellulose product, an isostatic pressure acting on the cellulose blank may provide for a remarkable decrease in the holding time needed to obtain the same mechanical properties of the final product. The present inventors have also found that, depending on the desired shape of the cellulose product, a non-isostatic pressure acting on the cellulose blank may provide a suitable forming of the cellulose product obtaining desirable mechanical properties of the final product.

In this context it should be noted that the required process time to obtain acceptable mechanical properties of the final product is related to the humidity of the blank and a specific temperature and a specific isostatic or non-isostatic pressure.

A temperature, preferable between 150-170° C., and a pressure, preferable between 3-7 MPa, can generate different mechanical properties. For example, an isostatic temperature of 168° C. and an isostatic pressure of 4.8 MPa at an air humidity of 50% relative humidity will generate a hard and stiff component at a holding time of 10 seconds. Lower temperature and pressure gives softer and more flexible components.

Also too much water in the blank will increase holding times a lot. ISBN 978-91-7501-518-7 describes holding times of 20 minutes and uses essentially wet pulp for the research. Experiments have shown that the optimum water content in the cellulose blank at the time of processing should be in the range 0.5-10% weight.

In severe cases, with large pressure variations, in the blank during bonding, parts of the component will never be acceptable regardless any holding time.

Prior art describes pulp compressing devices using traditional presses with hydraulic cylinders that converts hydraulic pressure, called the pressure media, to a force on a tool or a mould via a piston of the cylinder. When forming non-planar objects, like hollow 3D-objects, a forming mould with positive and negative mould parts, with a cavity representing the desired thickness and shape of the component in between, called mould cavity, which said mould is compressed by the force from the piston. Such a shape defined compressing device will lead to large variations in local pressure in the blank during heat processing, if no compensation to the component thickness versus processing pressure is performed. Any shape defined compressing device, without compensation for obtaining isostatic pressure, may thereby lead to uneven component quality and, in most industrial cases, unacceptable cycle times for production.

Moreover, the inventors have found that the required pressure level drastically can be reduced if an isostatic pressure method is used. ISBN 978-91-7501-518-7 has used a hollow hemisphere as reference object for the research using 45 MPa and 20 minutes in a shape defined compressing device. The internal pressure of the blank in the mould cavity is extremely high on top (by the pole) and close to zero at the bottom (adjacent to the equator). The present inventors have now surprisingly found that, by using an isostatic pressure such an object can be produced with one tenth of the used pressure at holding times counted in seconds.

According to various embodiments of the present invention, the cellulose blank may contain wood pulp. Although so-called mechanical pulp can be used for the cellulose blank, it has been found that chemical wood pulp yields better material properties of the product.

In embodiments, the cellulose blank may comprise at least 90 weight percent wood pulp and thus be almost exclusively made by easily recyclable material.

According to various embodiments, the pressure mould may advantageously comprise a flexible membrane, and the pressure moulding apparatus further comprises a fluid control device for controlling a fluid to exert an isostatic pressure on the cellulose blank via the fluid impermeable membrane.

In this context it should be noted that the term fluid encompasses both liquids and gases.

In some embodiments, the moulding apparatus may contain the pressure fluid in an enclosure partly bounded by the membrane. By increasing the amount of fluid in the enclosure and/or reducing the size of the enclosure, the fluid pressure will increase. The increasing fluid pressure will in turn result in an increased isostatic pressure acting on the cellulose blank.

Accordingly, the above-mentioned fluid control device may be an actuator compressing the fluid or a fluid flow control device for controllable allowing pressurized fluid to enter a pressure chamber having the flexible membrane as a portion of a wall thereof.

In some embodiments, the above-mentioned membrane may be an integral part of the apparatus, and may be used during a large number of pressing operations.

In other embodiments, the membrane may be fixed to the cellulose blank, for instance by means of an adhesive, during pressing, and the method may further comprise the step of providing a new membrane following the pressing step. In these embodiments, the membrane may for example be provided on a roll, and may be added to the manufactured product to add functionality to the product.

In yet further embodiments, the above-mentioned membrane may be provided on the cellulose blank.

According to a further aspect of the present invention, it is provided an isostatic pressure moulding apparatus for manufacturing a cellulose product having a flat or non-flat product shape starting from a cellulose blank, the isostatic pressure moulding apparatus comprising a forming mould having a forming surface defining the product shape; and a fluid control device for controlling a fluid to exert an isostatic pressure on the cellulose blank to press the cellulose blank against the forming surface.

The forming mould may comprise a negative forming mould part and a negative pressure mould part.

The forming mould may comprise a negative forming mould part and a positive pressure mould part.

The invention also relates to a cellulose product manufactured by the described method. The cellulose product is having a flat or essentially non-flat shape.

According to embodiments of the present invention, an isostatic pressure is obtained in force defined compressing devices, wherein said compressing devices comprises a flexible barrier or a membrane surrounding and separating the blank from the pressure media, e.g. gas, hydraulic oil, water, beverages to be packed, elastomer or dilatant material.

A method and a device according to embodiments of the present invention relates to blow moulding of hollow 3D objects like bottles, milk packages, cans and jars. Classic cellulose based packages for dairies and juice experience competition from blow moulded PET-bottles. Despite the fact that cellulose and paper based packages are renewable and recyclable, the mouldabillity of blow moulded PET has restrained the growth for folded paper packages.

According to said blow moulding embodiments, devices comprising, at least two negative forming moulds surrounding said cellulose fibres and a single use film layer barrier, to become an integrated part of the final component, wherein said cellulose fibres and said film layer barrier are provided to the cavity of the moulds in a tube shape and wherein said film layer barrier will separate the pressure media, when filled into said tube shape, from the cellulose fibres and wherein said pressure media will be pressurised to create an isostatic pressure on every portion of said cellulose fibres towards said forming moulds.

The present invention will thereby provide a method, tube shaped blank, a blow moulding device and renewable packages with similar properties as thermoplastics wherein said packages are recyclable as paper and cardboard.

Such a blow moulding device can preferably constitute the filling equipment on site at a diary, brewery or juice factory by using the beverage or liquid to be packed, as said pressure media.

According to other embodiments, an isostatic pressure is obtained in shape defined compressing devices, comprising two rigid moulds, one positive and one negative wherein the cavity between the closed moulds define the shape of the final three dimensional object and wherein the thickness of said cavity or the thickness of said blank, is designed to create an isostatic pressure on every portion of said cellulose fibres towards said moulds.

BRIEF DESCRIPTION OF DRAWINGS

These and other aspects of the present invention will now be described in more detail, with reference to the appended drawings showing example embodiments of the invention, wherein:

FIG. 1a-c schematically show a conventional press method, compressing device and component;

DESCRIPTION OF EXAMPLE EMBODIMENTS

Figure 2A:
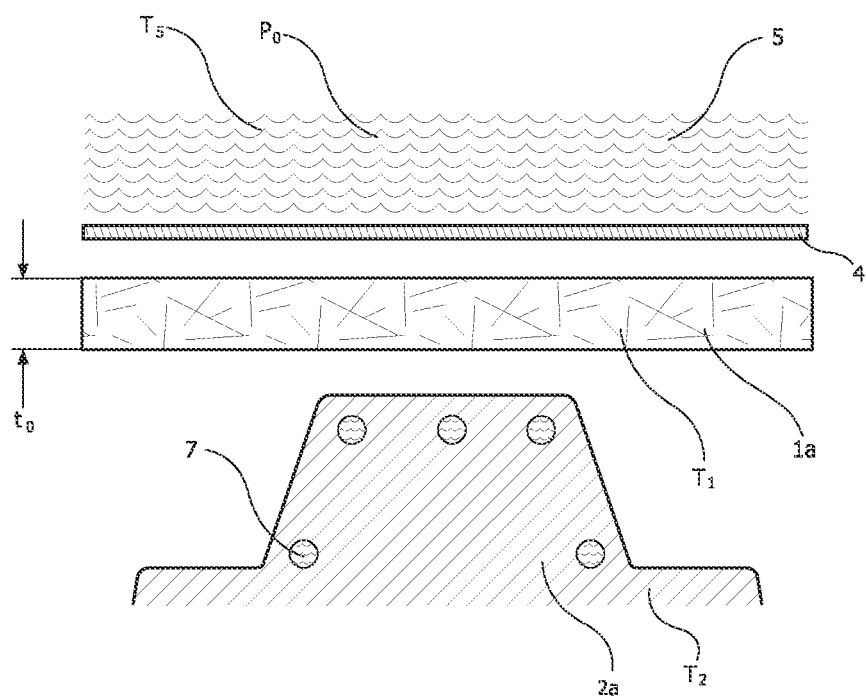
FIG. 2a-b schematically show an alternative configuration of the compressing device, using multi-use membrane, shown initial stage (a) and compressed stage (b) according to an example embodiment of the present invention.

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

In the present detailed description, a method for manufacturing a cellulose product, a pressure moulding apparatus, and a cellulose product will be described.

Various embodiments of sheet materials or blanks according to the disclosure are mainly discussed with reference to a cellulose blank placed in position for forming in a forming mould, in a flat shape. It should be noted that this by no means limits the scope of the present invention, which equally well includes, for example, a blank pre-shaped into a three-dimensional object. For instance, the blank may be presented to the forming mould in a shape similar to the desired final shape of the object. Another embodiment could comprise a cellulose blank, which is supplied to the mould in a web on a roll.

A flat shape may refer to a generally two-dimensional (2D) shape, such as for example the shape of a blank or a sheet material, and essentially non-flat shapes may refer to any suitable three-dimensional (3D) shape. An object according to the disclosure may be made in a two-dimensional shape, a three-dimensional shape, or formed into a three-dimensional shape from a two-dimensional blank or sheet material.

Moreover, by schematically showing a coherent sheet of cellulose fibres, this will by no means limit the scope of present invention, which equally well includes, for example, blanks with loose and separated fibres applied to the forming mould.

In the present detailed description, various embodiments of the three-dimensional object to be formed and the mould to form the objects according to the present invention are mainly discussed with reference to a hollow bowl, a hollow cup or a hollow bottle, with mainly uniform thickness. It should be noted that this by no means limits the scope of the present invention, which equally well includes, for example, complex shapes with different thickness, non-hollow portions or massive objects. For instance, the object can advantageously comprise stiffeners, creases, holes, 3D shaped text, hinges, locks, threads, snaps, feet, handles or surface patterns.

FIGS. 1a-c illustrate a conventional press method, compressing device and a component produced with non-isostatic pressure method and device.

FIG. 1a is a schematic side view of a prior art compressing device in a non-compressed state having a negative upper mould 102b and a positive lower forming mould 102a and a sheet of cellulose fibres 101a.

FIG. 1b is a schematic side view of a prior art compressing device in a compressed state having a negative upper pressure mould 102b and a positive lower forming mould 102a and a sheet of cellulose fibres 101a partly compressed by the force F forming the desired final shape 101b by using heat and pressure P.

As is customary, the thickness of the final component 101b is uniform and consequently the thickness of the cavity $t_1=r_b-r_a$ between the two moulds 102a and 102b is uniform. Since conventional tools for compressing is made of stiff metal, or similar non-flexible material, and since dry cellulose fibres not behave as a pressure equalising fluid, the pressure P in said cavity will depend on the amount of present blank 101 and the local pressure generating principle.

The local pressure generating principle at pressure $P_2$ and $P_5$ is defined by the force F. The local pressure generating principle at $P_4$ is defined by the geometry of the cavity and the amount of present blank 101. The local pressure $P_3$ is determined by a combination of force and shape defined pressure generating principle.

A shape defined pressure, like $P_4$, is highly dependent of the actual present amount of blank 101. Small and normally stochastic variations in the local material supply will drastically affect the obtained local pressure. Force defined pressure has linear gain and is a far more robust process for industrial usage.

FIG. 1c illustrate a three dimensional object, component, a hemi sphere 101b produced with above described conventional compression method. Since it is likely that some blank 101a will be stretched when the blank 101a bends over the lower mould 102a when the upper pressure mould 102b closes the tool over the blank 101a, the mechanical properties is different in location 101b $P_4$ than in location 101b $P_2$ of the finished component 101b.

A force defined compressing device according to an example embodiment of the present disclosure will now be described with reference to FIGS. 2a-b. In FIG. 2a, a schematic side view of a compressing device or pressure moulding apparatus, in the form of a forming mould 3 for cellulose fibres using heat is shown in an open state. The compressing device or forming mould may be constructed so that an isostatic pressure is applied when forming the cellulose product. The pressure applied may also be non-isostatic so that different pressure levels are applied in different parts of the forming mould 3 when forming the cellulose product. The forming mould 3 comprises at least one forming surface defining said product shape.

The forming mould 3 of this embodiment of the present disclosure uses one stiff forming mould part 2a placed under a multi-use membrane 4. The membrane 4 constitutes a seal for a pressure media or fluid 5, such as for example hydraulic oil, contained in a pressure chamber, not shown in the figure. The membrane 4, also called diaphragm, can preferably be made of rubber, silicon, elastomer or polyurethane.

Similar press devices are found in completely different industries like for example when forming metal sheets for aircrafts or processing of metallic powder into homogeneous materials. For instance, isostatic presses for conventional purposes normally uses very high pressure, such as within the range 1000-2000 bar.

The cellulose blank 1a, mainly comprising cellulose fibres with some additives and agents, has as shown in FIG.

2a been placed in a gap between the membrane 4 and the stiff forming mould part 2a, which in FIG. 2a is arranged below the membrane 4. The cellulose blank 1a may also contain an amount of water, which for example may depend on the humidity of the surrounding atmosphere.

In order to form the cellulose product, or a part of a cellulose product, from the cellulose blank 1a, the cellulose blank 1a, has to be heated to a forming temperature $T_1$, which may be in the range 100° C. to 200° C. The forming mould part 2a may be heated to a desired temperature $T_2$ so that heat is transferred to the cellulose blank 1a in order to achieve the forming temperature $T_1$ of the cellulose blank 1a. The forming mould 3 may for example be pre-heated to a temperature of 150-170° C. by pumping heated oil into internal channels 7 of the forming mould part 2a. An alternative way to pre-heat the forming mould 3 is to use integrated electrical resistors, not shown in the figure. The cellulose blank 1a can also be pre-heated, for example by using infrared rays prior to tool entrance. Heating the pressure media 5 to a pressure media temperature $T_5$ may also be a suitable alternative.

Figure 2B:
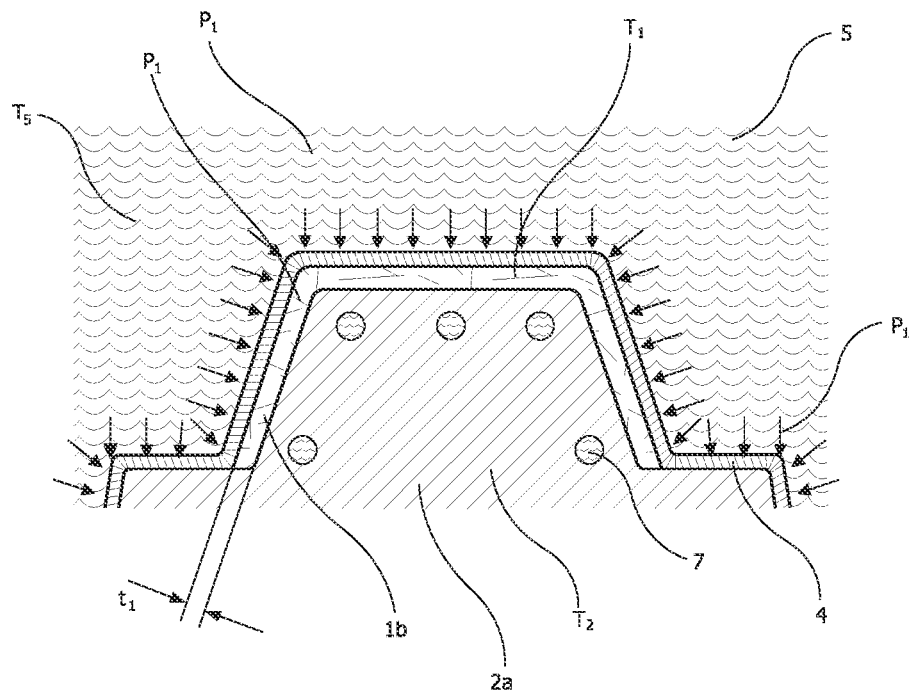

In FIG. 2b, the hydraulic oil 5 has been pressurized to a pressure of at least 1 MPa, and the membrane 4 has wrapped the heated forming mould 2a with the compressed material 1b forming the cellulose product in-between. A suitable pressure $P_1$ when forming the cellulose product may be within the range 1-100 MPa. By applying a suitable pressure $P_1$, the cellulose fibres are compressed. The applied pressure $P_1$ may be uniform or isostatic in order to compress the cellulose fibres evenly regardless of their relative position on the forming mould 2a and regardless of the actual local amount of fibres. In an alternative embodiment, the pressure may instead be non-isostatic so that different pressure levels in different parts of the forming mould 3 are used to form the cellulose product. This may for example be used if different structural properties in different parts of the cellulose product are desired.

The compressing device may comprise a fluid control device (not shown in the figures) and may be an actuator compressing the fluid 5 or a fluid flow control device for controllable allowing pressurized fluid 5 to enter the pressure chamber having the flexible membrane 4 as a portion of a wall thereof. The apparatus may comprise the fluid 5, or the fluid 5 may be air taken from the surrounding atmosphere.

The present inventors has found that a pressure $P_1$ of 4 MPa (40 bar) at a temperature of 160° C. when forming the cellulose product gives a fibril aggregation in the cellulose fibres that compares with many thermoplastics after 10 seconds of holding time.

In order to reduce the cycle time for industrial production of cellulose products from compressed material 1b, the cooling of said compressed material 1b may for example be done by pumping cooled oil into internal channels 7 arranged in the forming mould part 2a or into the pressure chamber wherein the forming mould part 2a temperature $T_2$ and pressure media 5 temperature $T_5$ quickly can be lowered after the fibril aggregation has completed in the cellulose fibres.

The process and the device will return to its open state shown in FIG. 2a by lowering the pressure media 5 to atmospheric pressure $P_0$ wherein said membrane 4 will retract to its more or less flat initial state and wherein the finished cellulose product can be ejected and preferable be cut free from unwanted residual compressed or un-compressed cellulose fibres.

The final thickness $t_1$ of the cellulose product may vary slightly depending on the actual local amount of cellulose fibres.

In an alternative embodiment, a stiff forming mould part may be used instead of the flexible or pliable membrane 4, which may be suitable if different pressure levels are desired when forming the cellulose product. The use of a flexible membrane 4 may provide an isostatic compressing method resulting in a homogeneous cellulose product with high strength and short production cycle time.

One difference between the inventive compressing method and device in FIG. 2a-b when using isostatic pressure and the prior art method and device in FIG. 1 a-b lies in the configuration using a flexible or pliable membrane 4 instead of the stiff upper mould 102b. An isostatic compressing method and device results in a homogeneous component with high strength and short production cycle time.

Above, one example embodiment of the isostatic compressing method and device was described with reference to FIGS. 2a-b. It should be understood that forming of three-dimensional objects in all-cellulose composite using heated compression moulding of wood pulp processed with only water can be obtained in other ways while still achieving isostatic pressure.

Figure 3A:
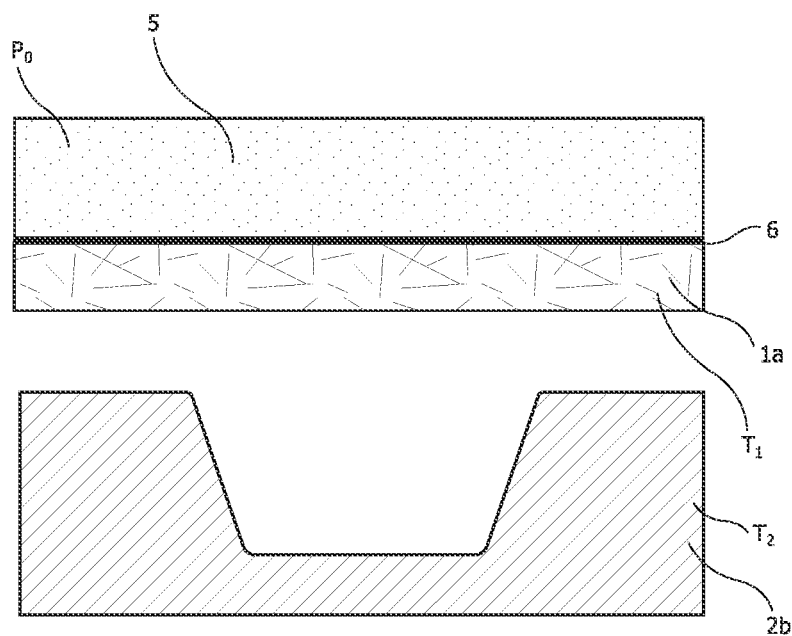
FIG. 3a-b schematically show an alternative configuration of the compressing device, comprising single-use material integrated barrier, shown initial stage (a) and compressed stage (b) according to an example embodiment of the present invention.
Figure 3B:
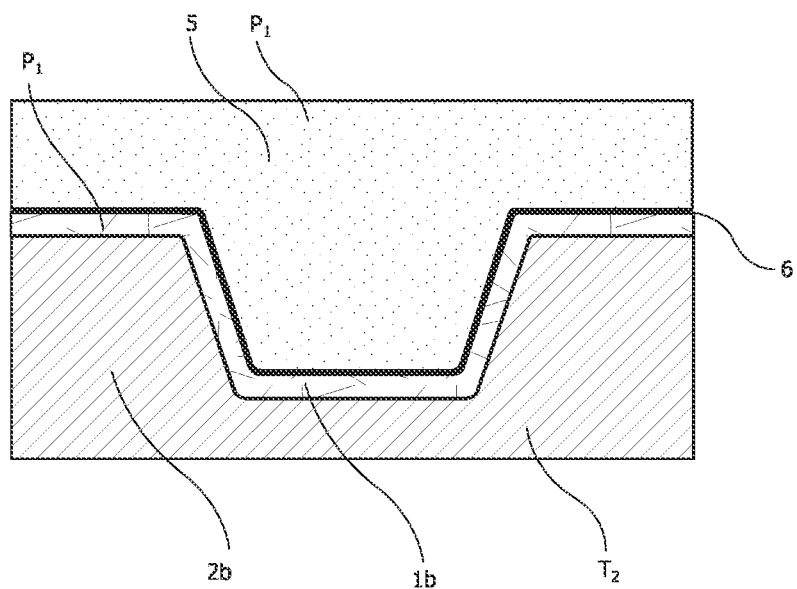

Referring to FIGS. 3a-b, the multi-use membrane 4 in FIGS. 2a-b has been replaced with a single-use membrane comprising a thin film barrier 6 wherein said barrier 6 may be pre-applied to the cellulose blank 1a when the cellulose blank 1a was produced or wherein the film barrier 6 is provided to the compressing device, for example from rolls, not shown in the figures, and applied to the cellulose blank 1a during the isostatic compression of the cellulose blank 1a.

Said thin film barrier 6 may be made of a thermoplastic material like PET or PLA, having a thickness within the range 1-700 μm.

FIG. 3a schematically shows the method comprising a compressing device or forming mould 3 in its initial open state, using the thin film barrier 6 applied to the cellulose fibres 1a, comprising a lower negative forming mould part 2b preheated to temperature $T_2$ and a pressure media or fluid 5, preferably gas or air at atmospheric pressure, contained in the pressure chamber, not shown in the figure.

FIG. 3b show the same device and cellulose blank 1a as shown in FIG. 3a in the compressed state wherein said pressure media 5, preferably compressed air or a non-contaminating liquid as water, has been pressurized to the pressure $P_1$ and wherein the thin film barrier 6 separates and seals the pressure media from the compressed material 1b of the cellulose blank 1a and wherein said pressure media 5 and membrane 6 forming equal pressure acting on the cellulose fibres across the heated forming surface, with a temperature $T_2$, of said forming mould part 2b.

By holding the equal pressure $P_1$ at the temperature $T_1$ for a certain period of time X, the fibril aggregation in the cellulose fibres will create a bio-composite component of the compressed material 1b with mechanical properties close to thermoplastics. If as an example, the pressure $P_1$ being 4 MPa (40 bar), the forming temperature $T_1$ being 140° C., the temperature $T_2$ of the forming mould part 2b being 160° C., and the time period X being 10 seconds, the bio-composite component of the compressed material 1b with mechanical properties close to thermoplastics can be achieved.

By removing the pressure media 5 and lower the pressure to atmosphere pressure $P_0$ after the time period X the cellulose product formed by the compressed material 1b can be ejected and if needed cut to its final shape.

One advantage with the method discussed in FIGS. 3a-b is that the film barrier 6 also can function as a barrier towards other media to be exposed to the component during usage. For example, if the cellulose product provided with the film barrier 6 is a bowl for on-the-go salads it is desired to have a barrier 6 to protect the cellulose fibres in the compressed material 1b from contact with the vegetables and to decrease the hygroscopic features of the bowl. This method could also be used for producing bottles or containers for liquid goods, and the cellulose product may thus be suitable for packaging different types of liquids or beverages, including carbonated liquids.

Turning to FIGS. 4a-d, the forming mould 3 comprises at least two openable and closable negative forming surfaces or parts 2a, 2b, surrounding a tube shaped cellulose blank 1a comprising a film barrier 6 wherein the outer layer is uncompressed cellulose 1a fibres and its additives and the inner layer 6 a single-use membrane comprising a thin film barrier 6. The blank can preferably be supplied to the compressing device in rolls, not shown in the figure, in flat shape wherein the blank is formed into a tube shape, not shown in the figure, surrounding a pressure media nozzle 8.

Figure 4A:
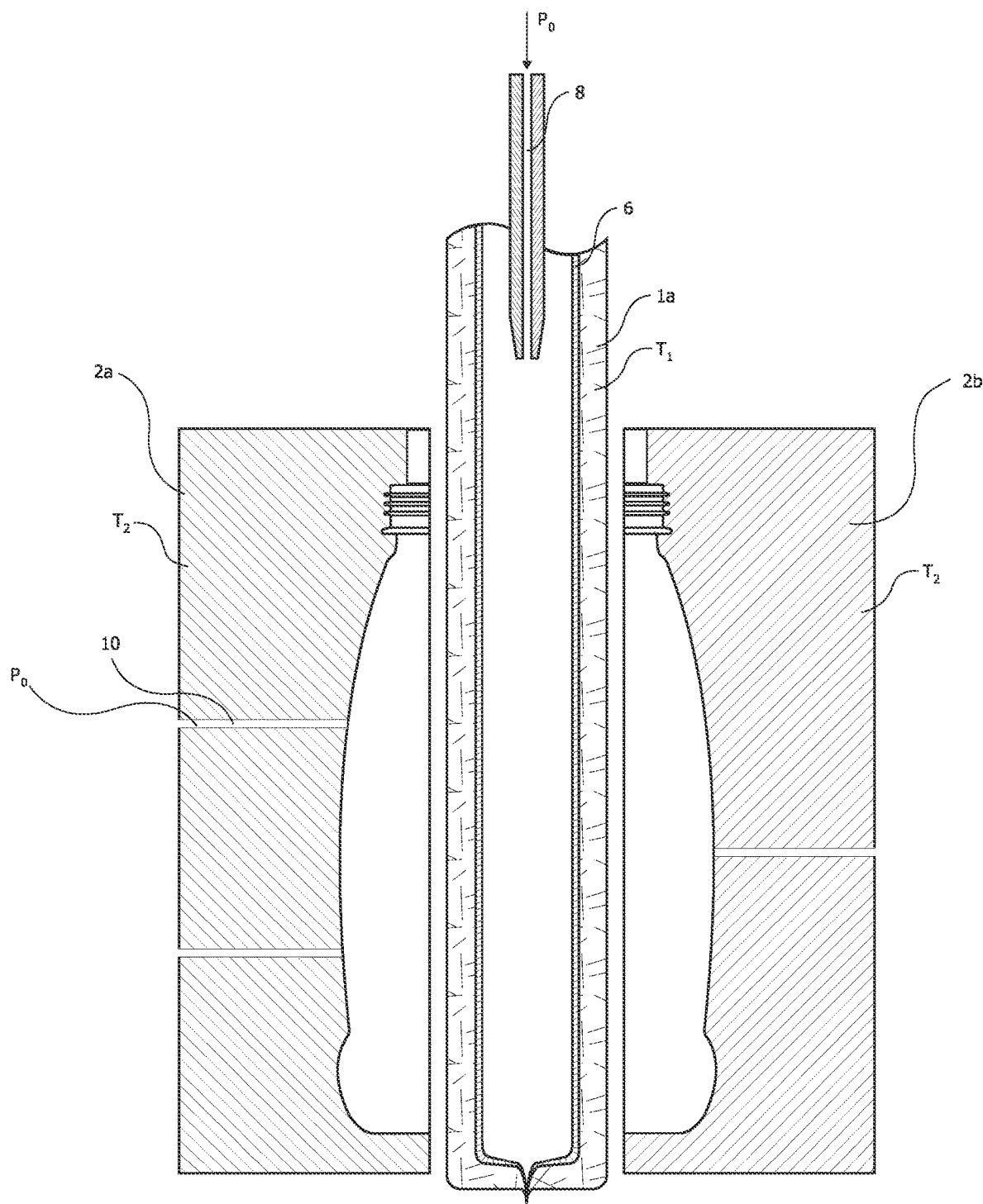
FIG. 4a-d schematically show an alternative configuration of the compressing device and component, using single-use material integrated barrier and blow moulding, shown initial stage (a & b) and compressed stage (c) according to an example embodiment of the present invention.

In FIG. 4a, the forming mould 3 with the forming surfaces or parts 2a, 2b are pre-heated to the forming mould temperature $T_2$, and are schematically shown in the open initial stage of the forming process method. The tube shaped cellulose blank 1a with the film barrier 6 is supplied from the top surrounding the fixed pressure media nozzle 8, which means that the tube shaped cellulose blank 1a with the film barrier 6 is supplied in a direction from above into the forming surfaces 2a, 2b.

Figure 4B:
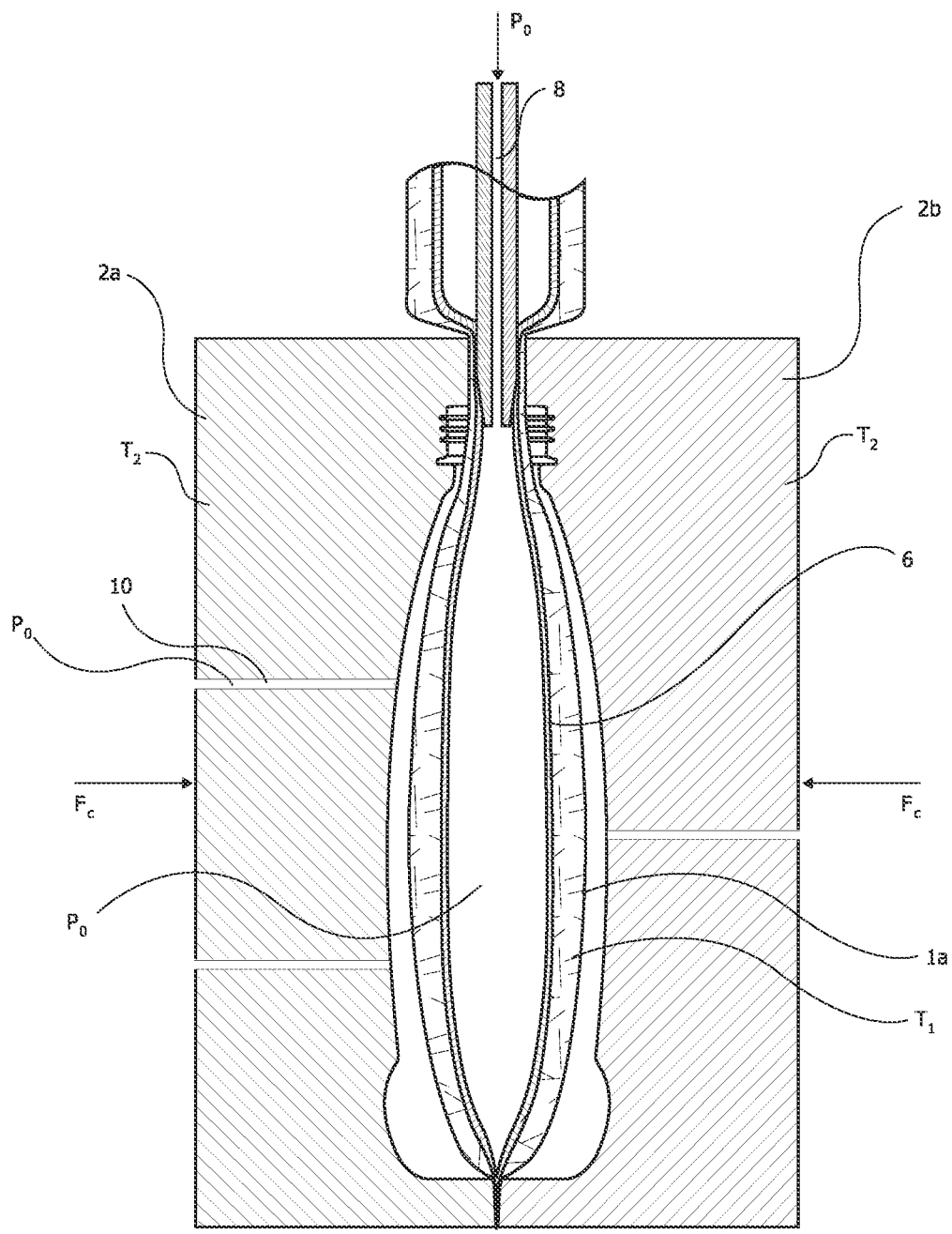
Figure 4C:
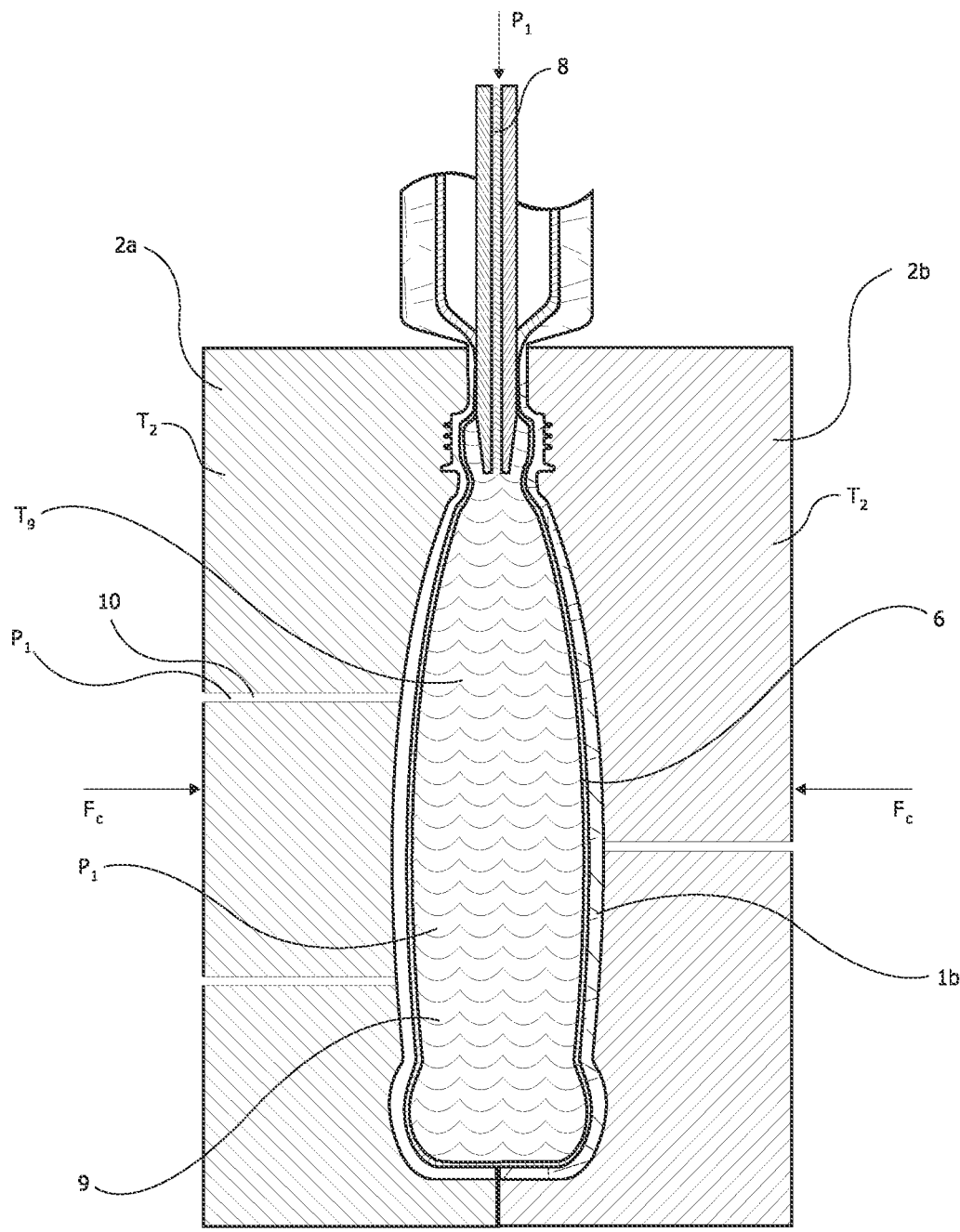

By closing the pre-heated forming mould 3 with a closing force $F_c$ which is higher than an opening force created by the pressure $P_1$ applied by the pressure media to the inside of the forming mould 3 by the pressure media nozzle 8 shown in FIG. 4c. The closed state of the forming mould 3 with the forming surfaces 2a, 2b is schematically shown in FIGS. 4 b-c. The closing force $F_c$ and the design of the forming surfaces 2a, 2b adjacent to the top and bottom of the cavity will seal the inner volume of the cellulose blank 1a from the outside atmospheric pressure $P_0$. In an alternative embodiment, the cellulose blank may be cut by the forming moulds from residual material when the forming mould 3 is closed.

FIG. 4c shows the forming and febrile aggregation phase of the method of present invention wherein said inner volume of the blank has been filled with pressure media 9 from the pressure media nozzle 8 and pressurized to the pressure $P_1$ wherein the pressure media 9 and the single-use membrane 6 forming equal pressure acting on the cellulose fibres across the heated forming surface of said forming moulds 2a and 2b.

The filling process is taking place between the steps shown in FIGS. 4b and 4c, and requires air channels 10 to enable the air outside the cellulose blank 1a with the film barrier 6 in the cavity of the forming mould 3 to be drained during the blank expansion process.

Figure 4D:
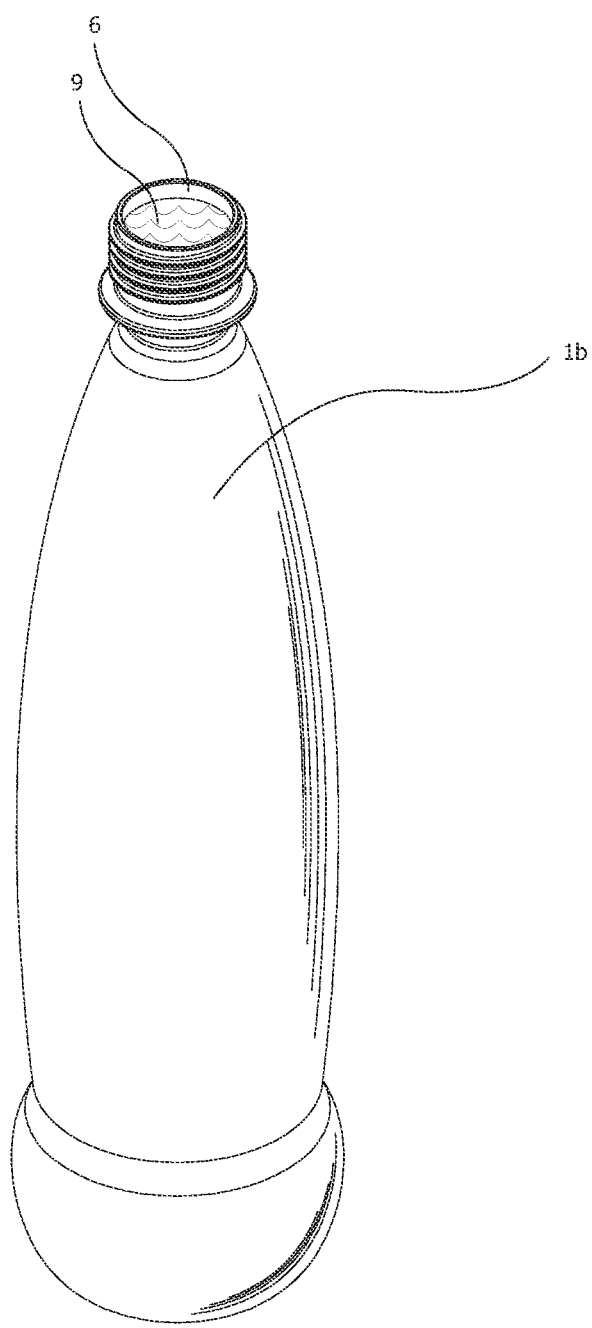

FIG. 4d illustrates a three dimensional cellulose product in the form of a hollow object made from the compressed material 1b and the film barrier 6, e.g. a bottle for beverages, formed by the method described in FIG. 4a-c filled with said pressure media 9 wherein the film barrier 6 separates the pressure media 9 from the compressed cellulose fibres 1b.

According to present disclosure the pressure media 9 is constituted by the beverage that is intended to be filled into the cellulose product, such as e.g. milk, juice, water and carbonated beverages.

The film barrier 6 can preferable be made of a thin thermoplastic material like PET or PLA, having a thickness in the range of 1-700 μm, wherein the film barrier 6, conventionally applied in paper packages for beverages, also seal the cellulose fibres 1b from contact with the beverage 9 during storage and usage of the cellulose product.

The cycle time for the process step shown in FIG. 4c can be reduced if the beverage 9 is cooled to a temperature $T_9$, for example in the range of 1-20° C., and filled fast, preferably in less than a second. If the forming mould 3 with the forming surfaces 2a, 2b is pre-heated to a mould temperature $T_2$, which for example is 200° C. and the blank is pre-heated to a temperature $T_1$, of for example 140° C., the pressure media temperature $T_9$ will enable release of the filled bottle from the forming mould 3 in cycle times of seconds or even less.

Figure 5A:
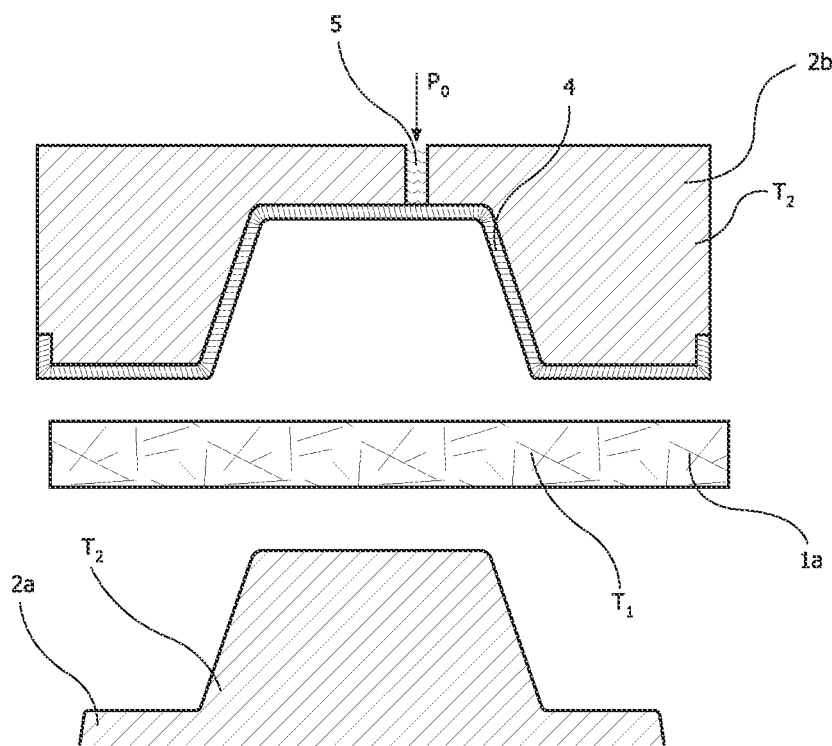
FIG. 5a-b schematically show an alternative configuration of the compressing device, using multi-use membrane, shown initial stage (a) and compressed stage (b) according to an example embodiment of the present invention.
Figure 5B:
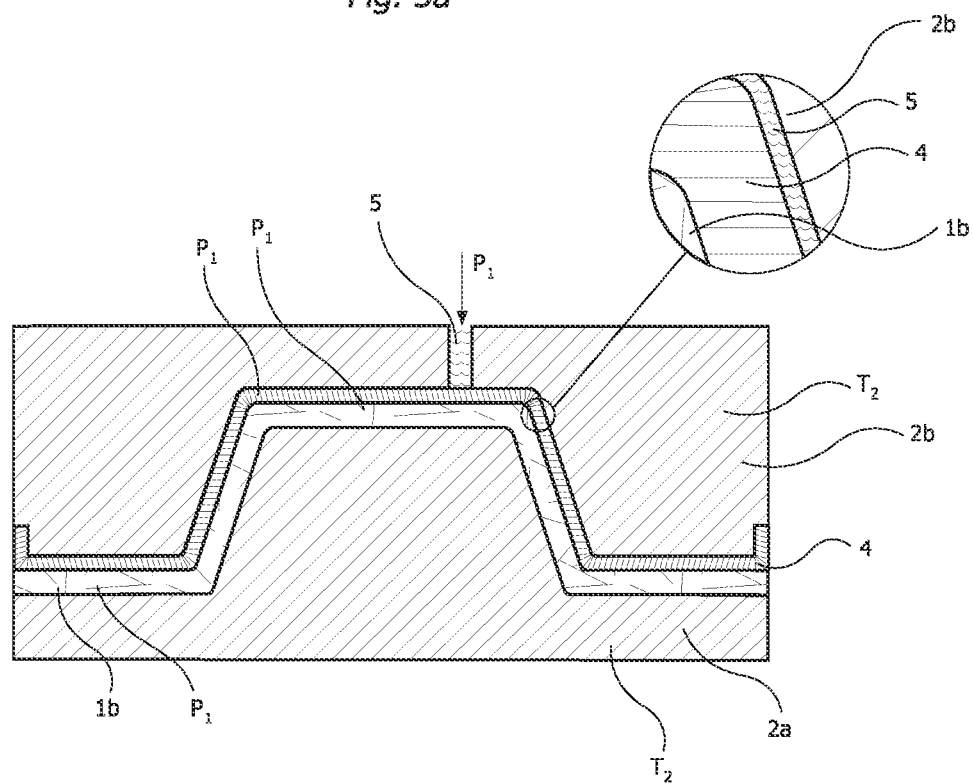

FIG. 5a-b schematically show another principle of the present disclosure, wherein the compressing device comprises at least one positive forming mould part 2a, at least one negative pressure mould part 2b and a multi-use pre-shaped membrane 4, wherein the pressure media 5 is pressurized to the pressure $P_1$ after the mould parts 2a and 2b, surrounding the cellulose blank 1a, has been closed.

The final forming stage where fibril aggregation in the cellulose fibres of the cellulose blank 1a takes place is shown in FIG. 5b. The enlarged cross section shown in FIG. 5b illustrates how the pressure media 5 penetrates into the forming mould 3 between the upper negative pressure mould part 2b and the membrane 4 wherein a pressure $P_1$, uniformly will compress the cellulose blank 1a towards the forming surface of the pre-heated lower positive forming mould 2a. The penetration of pressure media 5 can be facilitated by minor indentations, not shown in the figure, in the surface of the upper negative pressure mould part 2b acting as micro channels for the pressure media 5.

The embodiment of the compressing device according to FIGS. 5a-b may be beneficial compared to the method discussed in FIGS. 2a-b, where shorter cycle times are preferred. The membrane 4 does not have to deform to the same extent in the embodiment shown in FIGS. 5a-b.

The above described examples of the compressing method, with reference to FIGS. 2-5, comprises a flexible membrane 4, which may be used to provide an isostatic pressure. It should be understood that forming of three-dimensional objects in all-cellulose composite using heated compression moulding of wood pulps processed with only water can be obtained using conventional tools while still achieving isostatic pressure.

Figure 6A:
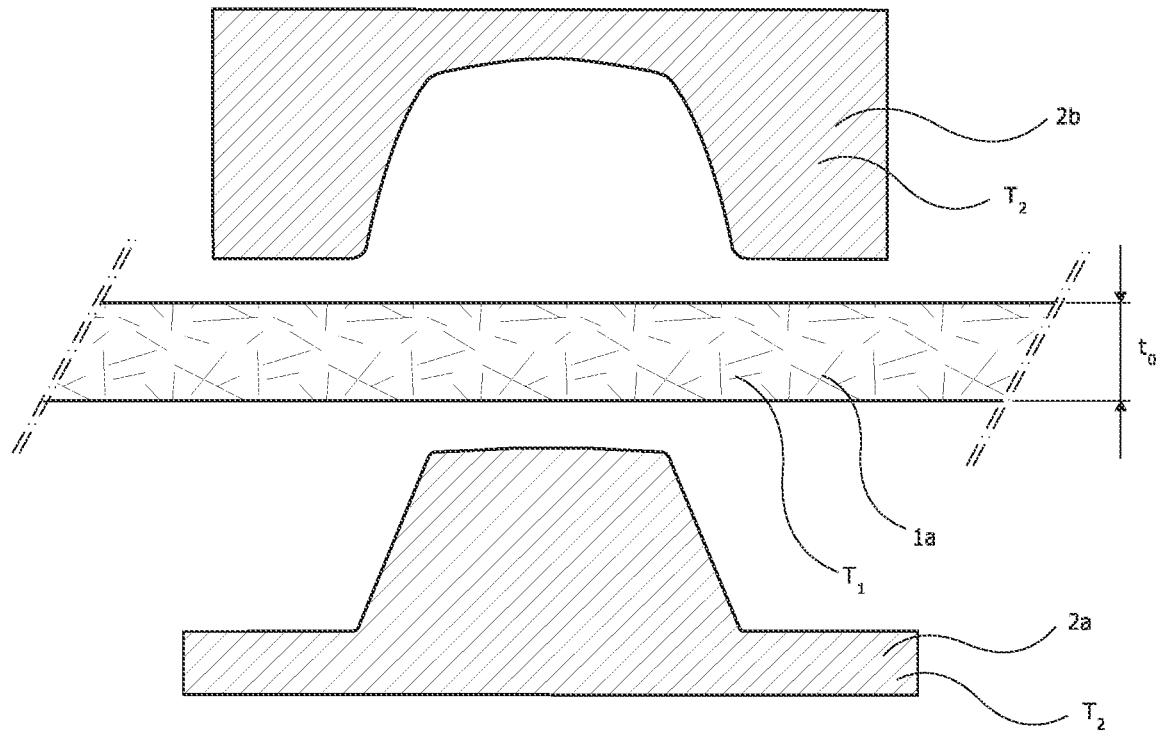
FIG. 6a-c schematically show an alternative configuration of the compressing, using cavity compensating pressure control, shown initial stage (a & b) and compressed stage (c) according to an example embodiment of the present invention.
Figure 6B:
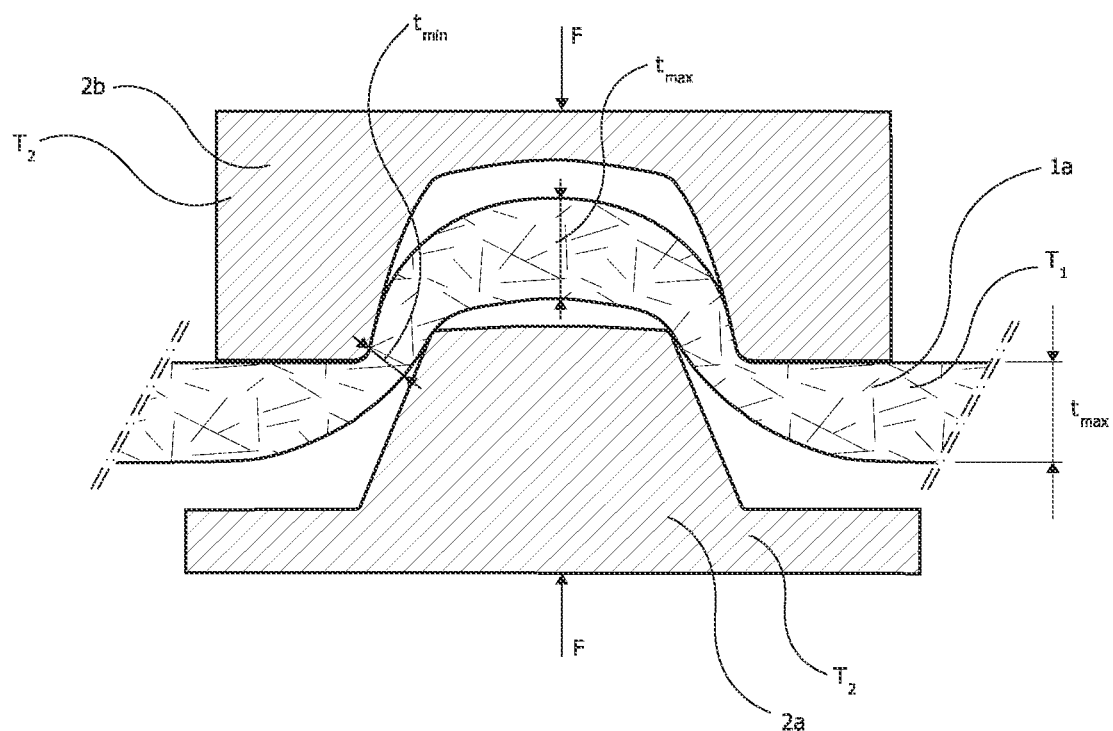
Figure 6C:
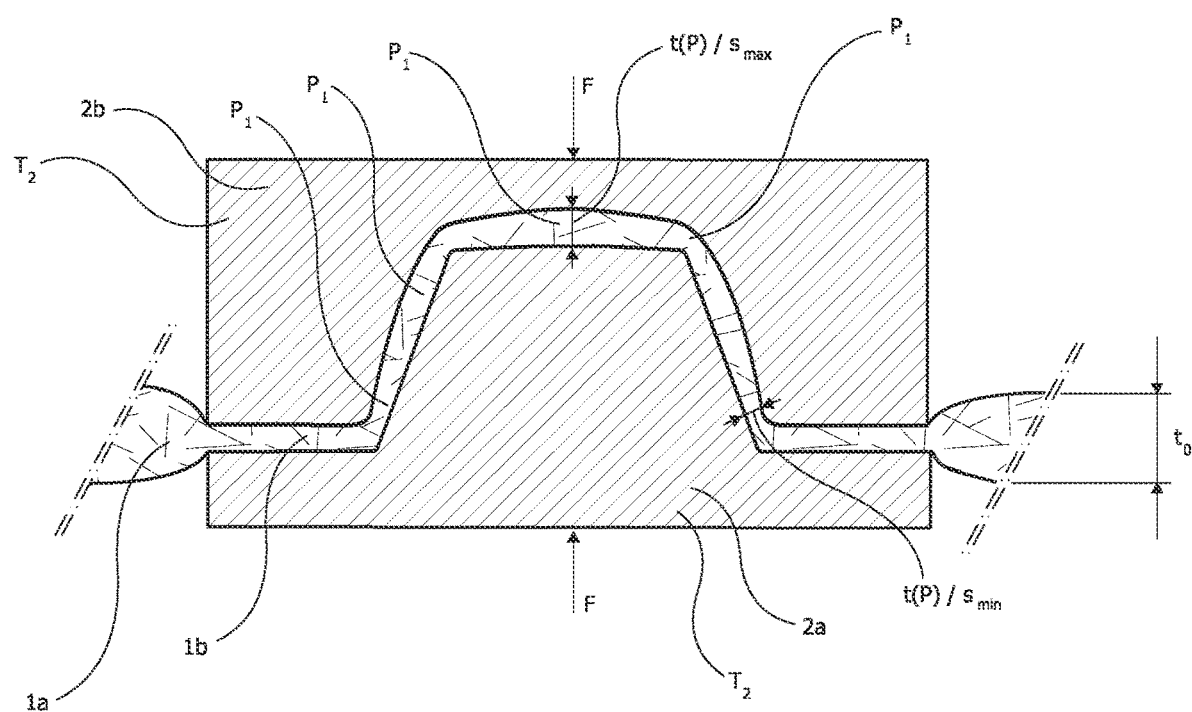

Referring to FIGS. 6a-c, an upper pre-heated negative non-flexible pressure mould part 2b and a lower pre-heated positive non-flexible forming mould part 2a, surrounds the cellulose blank 1a wherein the cavity thickness t(P) between the lower pre-heated positive non-flexible forming mould part 2a and the upper pre-heated negative non-flexible pressure mould part 2b deviates from nominal even thickness where the deviation is theoretically and/or practically established to create an isostatic pressure $P_1$ on every portion of cellulose blank 1a towards the mould parts 2a and 2b when the mould parts are pressed together with the force F.

FIG. 6a schematically shows the embodiment in an initial open state with the cellulose blank in a flat state fed to the mould parts in a continuous web 1a. FIG. 6c schematically shows the embodiment in a closed state with the cellulose blank 1a in a compressed non-flat state. FIG. 6b schematically shows the embodiment in a state in-between the open and the closed, in a non-compressed non-flat state.

FIGS. 6a-c show an example of a compressing device for a hollow bowl, where the positive forming mould part 2a has a nominal, preferred, shape and where the negative pressure mould part 2b has a compensated shape in order to obtain equal pressure $P_1$.

As shown in FIG. 6b the blank is deformed by the two mould parts 2a, 2b wherein the thickness t of the cellulose blank 1a varies due to friction and deformation restrain in the cellulose blank 1a. In this schematic example, which can be altered in many ways, the cellulose blank 1a will end up with a thinnest thickness $t_{min}$, adjacent to the cavity entrance of the pressure mould 2b and a thickest thickness $t_{max}$ on the top of the forming mould 2a.

The cavity thickness, s, between the two mould parts 2a, 2b is therefore compensated so the most narrow cavity thickness $s_{min}$ is situated adjacent to where the cellulose blank is thinnest $t_{min}$ and the most wide cavity thickness $s_{max}$ is situated adjacent to where the un-compressed cellulose blank 1a is thickest $t_{max}$, by means of the negative pressure mould 2b, pressing the cellulose blank 1a against the forming positive mould 2a with a substantially equal forming pressure $P_1$ acting on the cellulose blank 1a across the forming surface.

Moreover, the relation between thickness of the cellulose blank, t, and the cavity thickness, s, and the final cavity shape, is also related to the geometrical pressure generation of the cavity. The force F determines the pressure $P_1$ on top of the positive forming mould part 2a while the convexity, thickness and angel of the cavity adjacent to the most narrow cavity thickness $s_{min}$ determines the final pressure $P_1$.

The inventors of present invention have found that the final shape of the cavity is a complex algorithm t(P) in order to obtain substantially isostatic pressure $P_1$ where both mathematical, preferably FEM-analysis, and empirical tests, preferably trial-and-error, is required to obtain equal pressure all over the component.

According to another embodiment of the present disclosure, without flexible membrane, the geometrically pressure compensated cavity in FIGS. 6a-c can be substituted with thickness compensation of the cellulose blank.

Figure 7A:
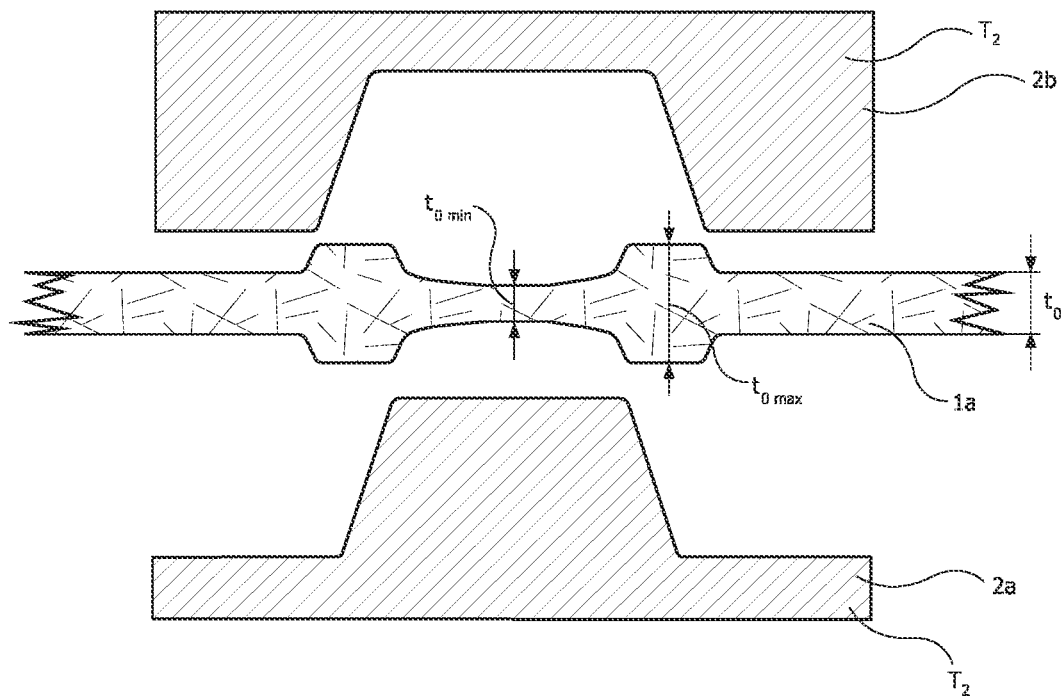
FIG. 7a-b schematically show an alternative configuration of the compressing device, using blank thickness compensation, shown initial stage (a) and compressed stage (b) according to an example embodiment of the present invention.
Figure 7B:
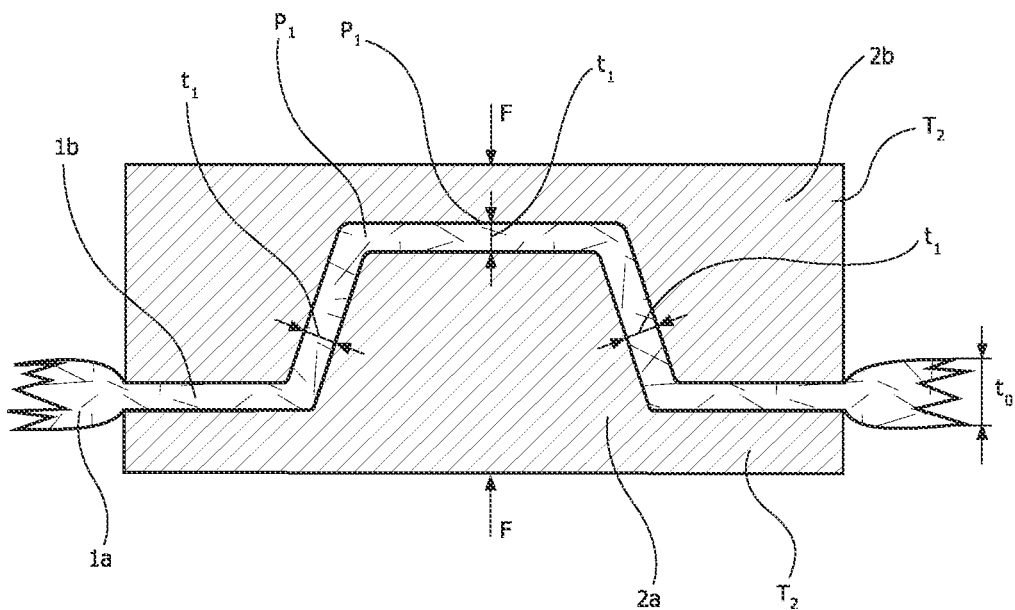

FIGS. 7a-b schematically show a traditional non-compensated pressure negative forming mould part 2b and a non-compensated positive forming mould part 2a, with a preferred equal and nominal cavity thickness, t, wherein the blank has a pressure compensated thickness between $t_{min}$–$t_{max}$ established with same theory and in the same manner as described for the embodiment discussed in relation to FIGS. 6a-c.

The preference for the method of creating isostatic pressure without flexible membrane, presented in relation to FIGS. 6a-c and 7a-b, relates to shorter cycle time and lower cost for the compressing device. However, the development effort might be more costly for the method using stiff moulds.

The advantage for using the method described in relation to FIGS. 7a-b over the method described in relation to FIGS. 6a-c is the achieved even thickness $t_1$ of the final cellulose product. However, the blanks might be more costly to produce in the method described in FIGS. 7 a-b.

Figure 8A:
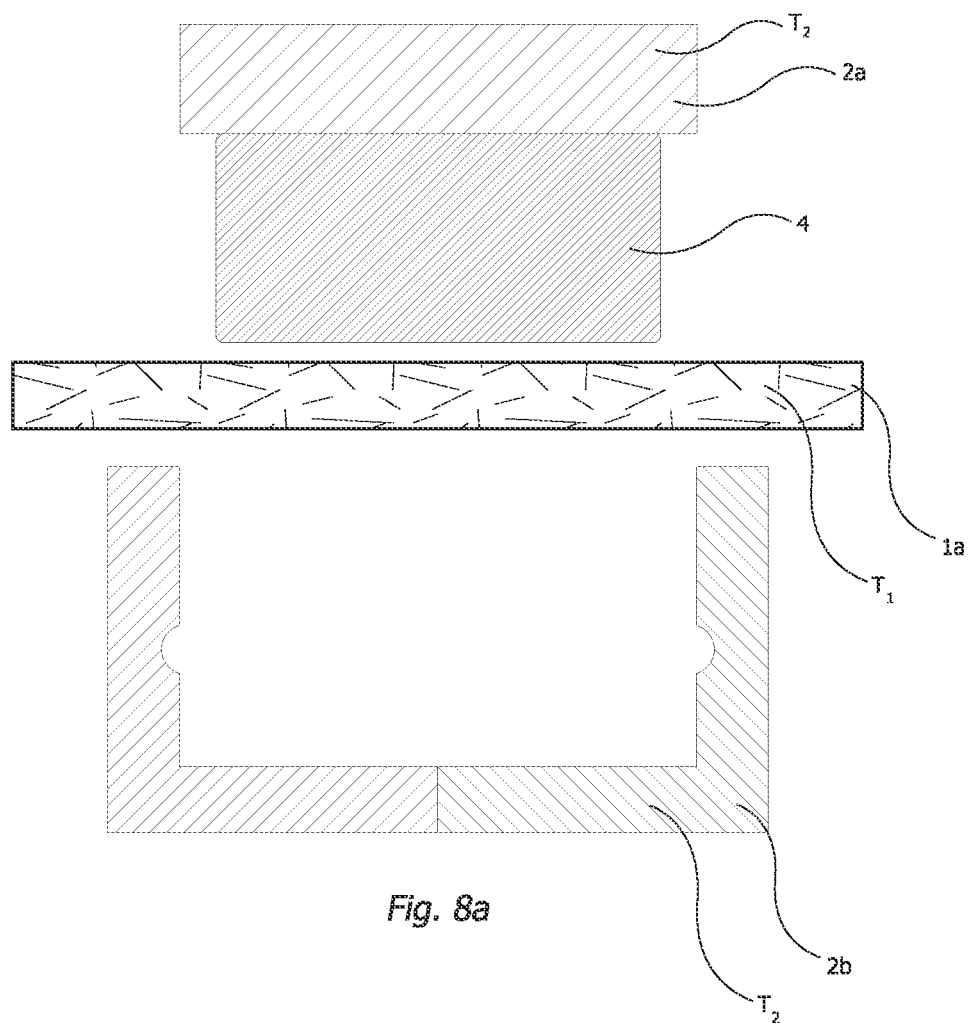
FIG. 8a-c schematically show an alternative configuration of the compressing device, using a massive flexible membrane.
Figure 8B:
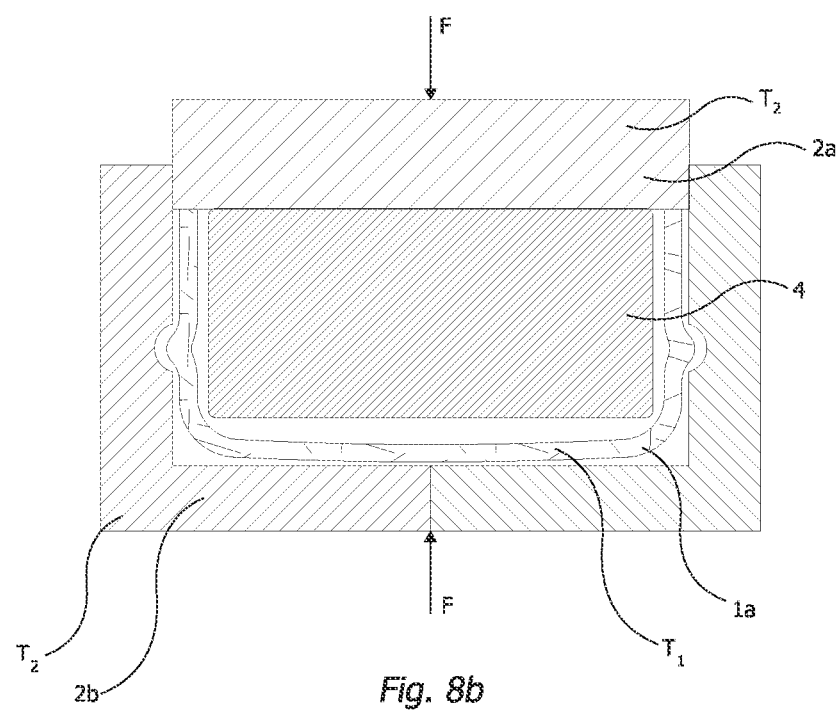
Figure 8C:
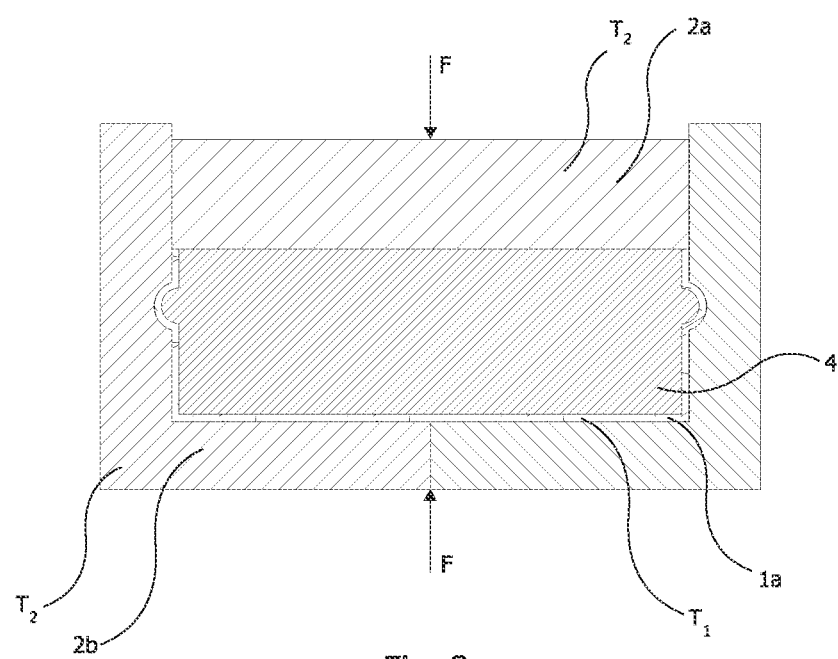

As an alternative, the forming mould 3 may also be arranged with a membrane constructed as a massive flexible membrane structure. In FIGS. 8a-c an alternative forming mould 3 with a negative forming mould part 2b and a positive forming mould part 2a is schematically shown. The positive forming mould part 2a is applying a forming pressure, F, on a massive flexible membrane 4, which is applying an isostatic pressure on the cellulose blank 1a when forming the cellulose product. With massive flexible membrane is meant a flexible structure, which has a similar ability to apply the isostatic pressure to the cellulose blank 1a, as the membrane structures described in the embodiments above, but with a greater elastic deformation zone compared to thinner membrane structures. The massive flexible membrane 4 may be constructed with a thick membrane structure or even be made of a homogeneous body of a flexible material. The flexible material may have properties that will make the material float out between the forming mould parts when pressure is applied to the body. In the embodiment shown in FIGS. 8a-c, the massive flexible membrane 4 is constructed from a homogeneous body of a flexible material.

In an alternative embodiment, the massive flexible membrane 4 may have a varied thickness, where the massive flexible membrane is for example shaped or casted into a structure with a varied thickness. The thinner and thicker areas of the massive flexible membrane with varied thickness may compensate for areas in the forming mould parts which need smaller or bigger deformation of the membrane in order to equalize or even out the pressure subjected to the cellulose blank 1a. By using a massive flexible membrane structure the forming mould can be made cheaper and simpler in construction.

The massive flexible membrane 4 is constructed so that when the pressure, F, is applied from the forming mould parts, the massive flexible membrane 4 deforms in order to provide the isostatic pressure. The massive flexible membrane 4 may be made of a suitable elastomeric material, such as for example rubber, silicone, polyurethane or other elastomer. Due to the flexible properties of the massive flexible membrane 4, the massive flexible membrane 4 applies an isostatic pressure to the cellulose blank 1a.

In FIG. 8a, the cellulose blank 1a is placed between the negative forming mould part 2b and the massive flexible membrane 4. The positive forming mould part 2a is pushing the massive flexible membrane 4 and the cellulose blank 1a into the negative forming mould part 2b when the forming pressure, F, is applied to the forming mould parts, as shown in FIGS. 8a-b. When forming the cellulose product, the negative forming mould part 2b is heated to a forming mould part temperature $T_2$ and during the forming process, the cellulose blank 1a is heated to a forming temperature $T_1$, see FIGS. 8a-c.

Figure 9A:
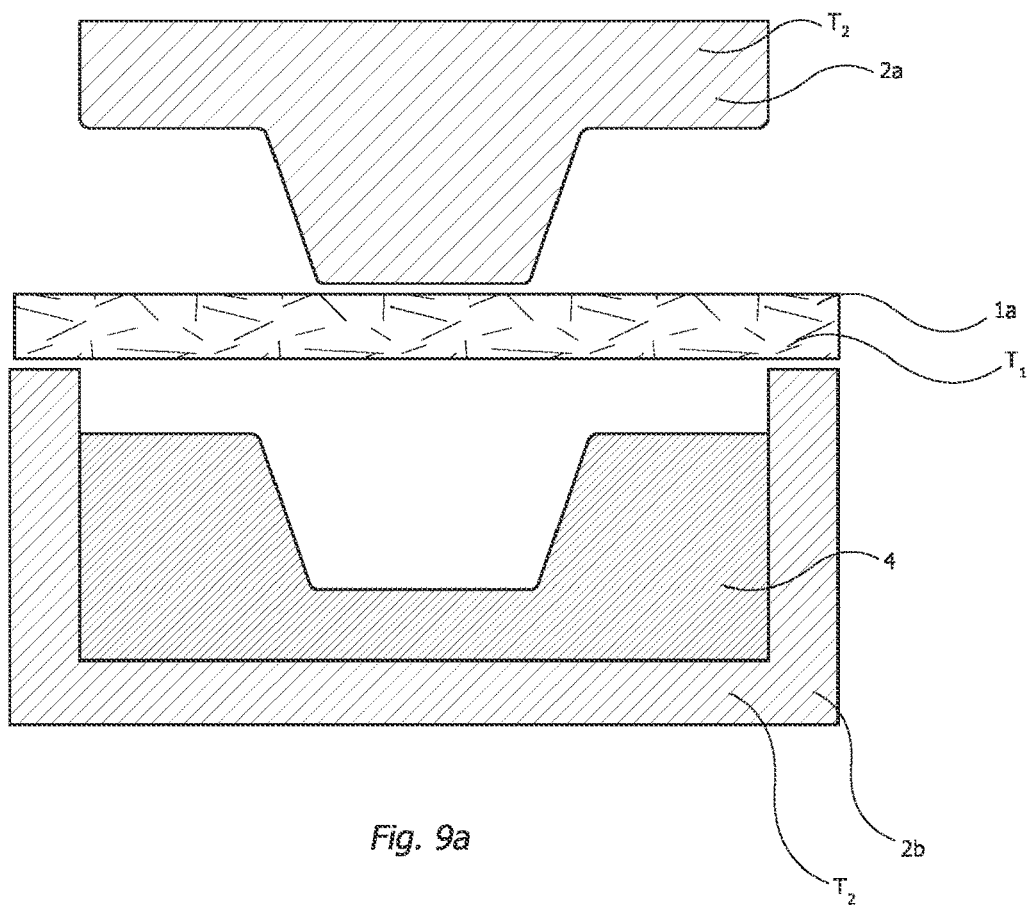
FIG. 9a-c schematically show another alternative configuration of the compressing device, using a massive flexible membrane.
Figure 9B:
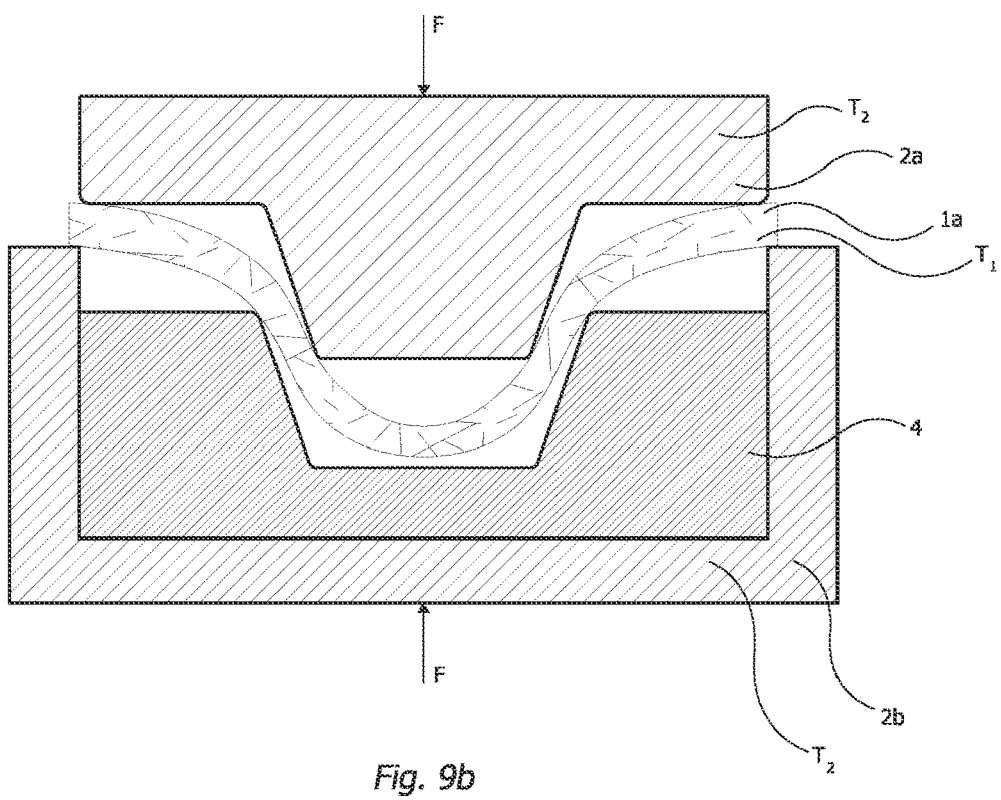
Figure 9C:
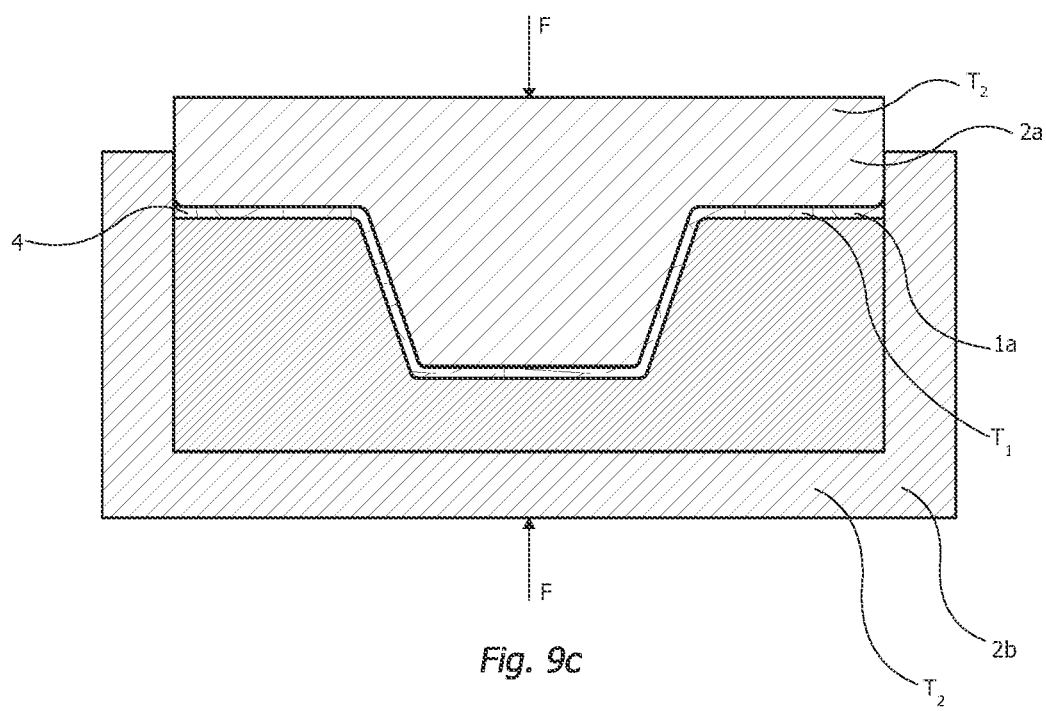

In FIGS. 9a-c another alternative forming mould 3 with a negative forming mould part 2b and a positive forming mould part 2a is schematically shown. The negative forming mould part 2b is applying a forming pressure, F, on a massive flexible membrane 4, which is applying an isostatic pressure on the cellulose blank 1a when forming the cellulose product. The massive flexible membrane 4 is constructed so that when the pressure, F, is applied from the forming mould parts, the massive flexible membrane 4 deforms in order to provide the isostatic pressure. The massive flexible membrane 4 may be of the same construction as described above in relation to the embodiment shown in FIGS. 8a-c. In the embodiment shown in FIGS. 9a-c, the massive flexible membrane 4 has a varied thickness to match the shape of the positive forming mould part 2a. Due to the flexible properties of the massive flexible membrane 4, the massive flexible membrane 4 applies an isostatic pressure to the cellulose blank 1a.

In FIG. 9a, the cellulose blank 1a is placed between the positive forming mould part 2a and the massive flexible membrane 4. The positive forming mould part 2a is pushing the cellulose blank 1a into the negative forming mould part 2b towards the massive flexible membrane 4 when the forming pressure, F, is applied to the forming mould parts, as shown in FIGS. 9a-b. When forming the cellulose product, the positive forming mould part 2a is heated to a forming mould part temperature $T_2$ and during the forming process, the cellulose blank 1a is heated to a forming temperature $T_1$, see FIGS. 9a-c.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

Reference signs mentioned in the claims should not be seen as limiting the extent of the matter protected by the claims, and their sole function is to make claims easier to understand.

The invention claimed is:

1. A method for manufacturing a cellulose product having a non-flat product shape by a pressure moulding apparatus comprising a forming mould, the forming mould having a forming surface defining said product shape, comprising the steps of:
    arranging a tube shaped cellulose blank containing less than 45 weight percent water in said forming mould, wherein an outer layer of the tube shaped cellulose blank is uncompressed cellulose fibres and its additives and an inner layer is a single-use membrane comprising a thin film barrier, wherein the forming mould comprises at least two openable and closable negative forming surfaces or parts surrounding the tube shaped cellulose blank, wherein the tube shaped cellulose blank is supplied from the top surrounding a fixed pressure media nozzle;
    heating said cellulose blank to a forming temperature in the range of 100° C. to 200° C.; and
    pressing said cellulose blank by means of said forming mould with a forming pressure acting on the cellulose blank across said forming surface by filling an inner volume of the cellulose blank with a pressure media from the pressure media nozzle, said forming pressure being in the range of 1 MPa to 100 MPa.

2. The method according to claim 1, wherein said cellulose blank contains less than 25 weight percent water.

3. The method according to claim 1, wherein said cellulose blank comprises wood pulp.

4. The method according to claim 1, wherein said step of heating at least partly takes place before said step of pressing.

5. The method according claim 1, wherein the forming mould comprises a forming mould part and pressure mould part and at least one of said forming mould part and pressure mould part is heated before said step of pressing.

6. The method according to claim 2, wherein said cellulose blank contains less than 15 percent water.

7. The method according to claim 3, wherein said cellulose blank comprises at least 90 percent wood pulp.

* * * * *